(12) United States Patent
Grant et al.

(10) Patent No.: US 10,509,472 B2
(45) Date of Patent: Dec. 17, 2019

(54) METHODS AND APPARATUSES FOR ENDSTOP DIMINISHMENT SOLUTIONS IN HAPTICALLY-ENABLED CONTROLLER DEVICES

(71) Applicant: Immersion Corporation, San Jose, CA (US)

(72) Inventors: Danny A. Grant, Laval (CA); William S. Rihn, San Jose, CA (US); Simon Forest, Montreal (CA); Stephen D. Rank, San Jose, CA (US); Neil T. Olien, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 85 days.

(21) Appl. No.: 15/623,987

(22) Filed: Jun. 15, 2017

(65) Prior Publication Data
US 2018/0018020 A1 Jan. 18, 2018

Related U.S. Application Data

(60) Provisional application No. 62/363,003, filed on Jul. 15, 2016.

(51) Int. Cl.
*G06F 3/01* (2006.01)
*A63F 13/24* (2014.01)
(Continued)

(52) U.S. Cl.
CPC .............. *G06F 3/016* (2013.01); *A63F 13/24* (2014.09); *A63F 13/285* (2014.09); *G06F 3/0338* (2013.01); *A63F 2300/8082* (2013.01)

(58) Field of Classification Search
CPC ........ G06F 3/016; G06F 3/0338; A63F 13/24; A63F 13/285; A63F 2300/8082
See application file for complete search history.

(56) References Cited

U.S. PATENT DOCUMENTS 9,174,134 B1 11/2015 Grant et al.
2002/0190528 A1 12/2002 Ootori
(Continued)

OTHER PUBLICATIONS

Partial European Search Report issued in EP 17181332.2, dated Sep. 27, 2017.
(Continued)

*Primary Examiner* — Liliana Cerullo
(74) *Attorney, Agent, or Firm* — Medler Ferro Woodhouse & Mills PLLC

(57) ABSTRACT

A haptically-enabled controller device comprising a controller body, a user input element, a haptic actuator, and a transmission component is presented. The user input element has a range of motion that extends from a first position to an end stop position. The haptic actuator is configured to output a force or torque. The transmission component comprises an arm connected to the haptic actuator and to the user input element. The arm is configured to transfer the force or torque from the haptic actuator to the user input element with a first multiplication factor when the user input element is at the first position, and to transfer the force or torque from the haptic actuator to the user input element with a second multiplication factor when the user input element is at the end stop position. The second multiplication factor is higher than the first multiplication factor.

16 Claims, 21 Drawing Sheets

(51) Int. Cl.
A63F 13/285 (2014.01)
G06F 3/0338 (2013.01)

(56) References Cited

U.S. PATENT DOCUMENTS

2012/0232780 A1* 9/2012 Delson .................... A63F 13/06
 701/400
2013/0147610 A1 6/2013 Grant et al.
2015/0133221 A1 5/2015 Grant

OTHER PUBLICATIONS

European Office Action issued in European Application No. 17181332.2 dated Aug. 8, 2019.

* cited by examiner

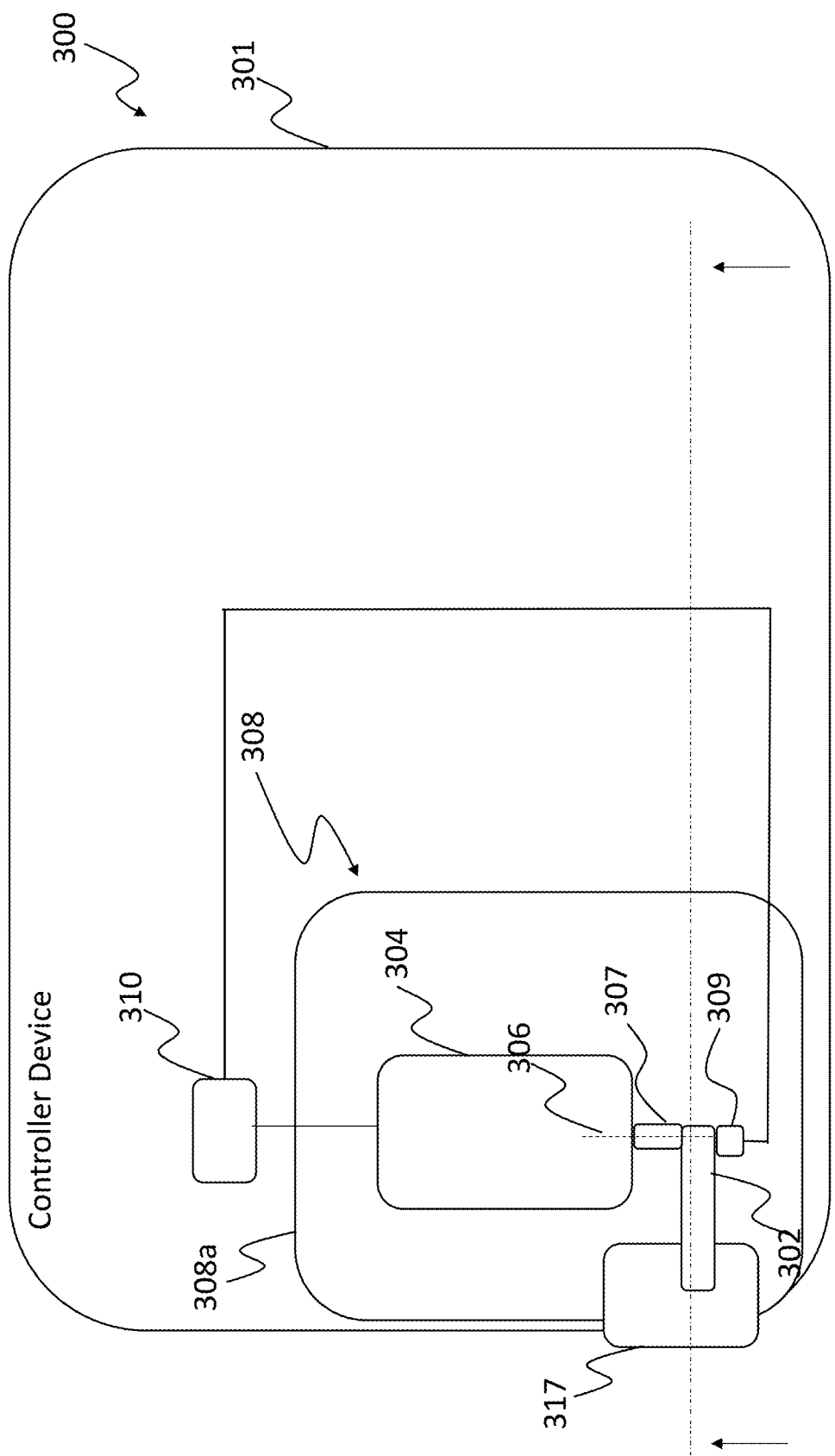

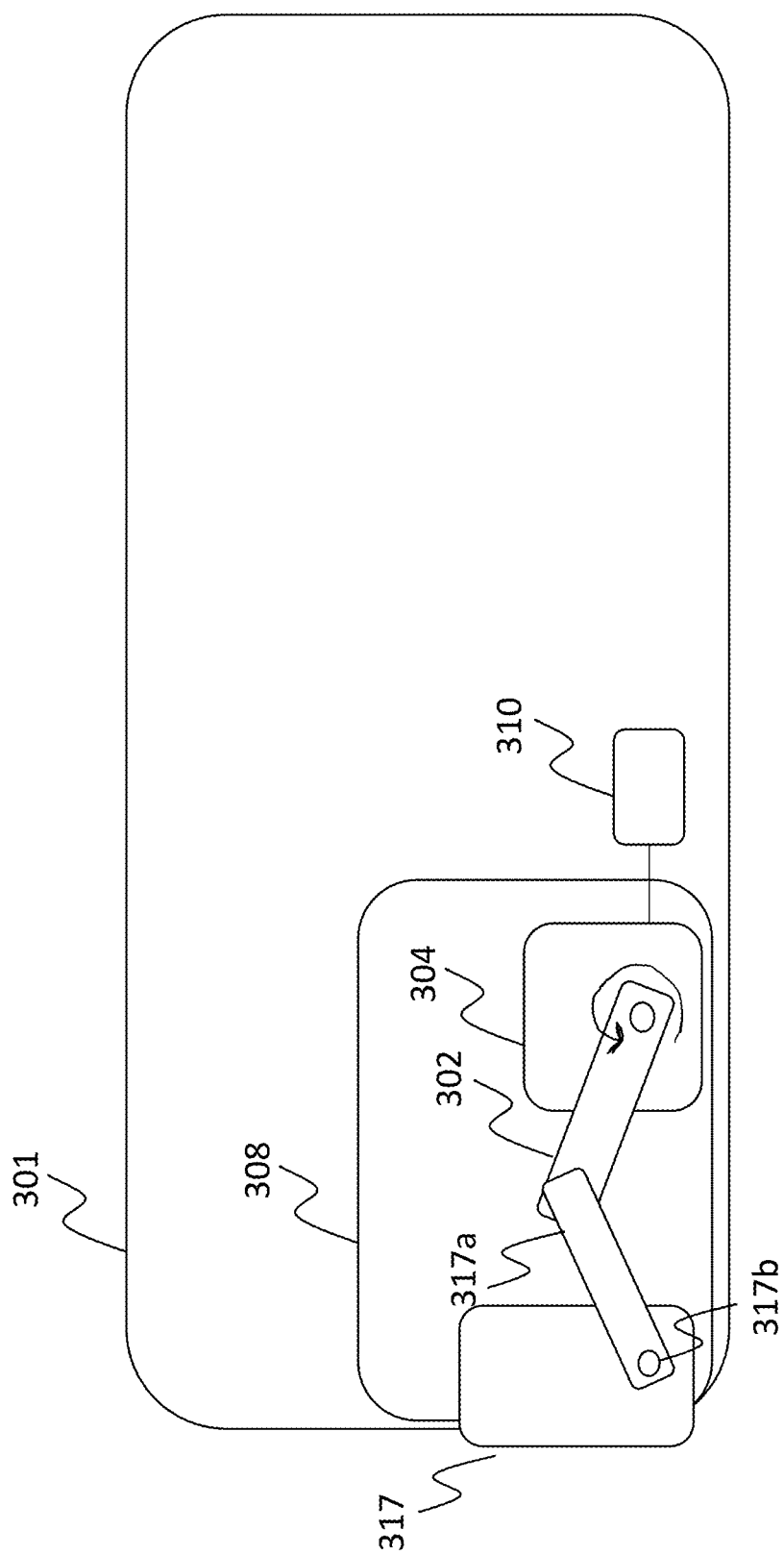

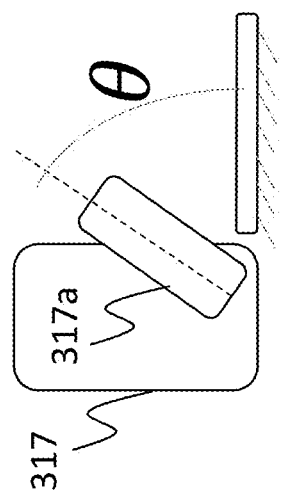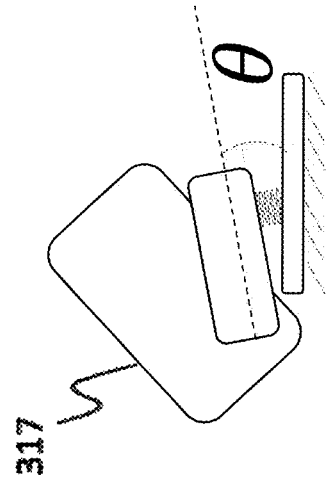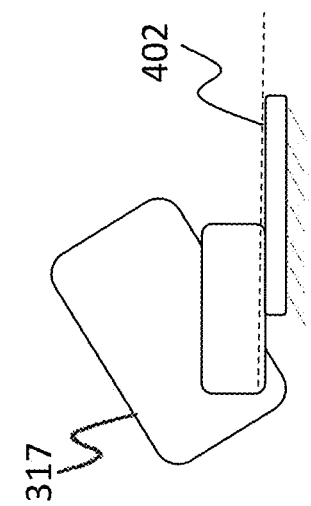

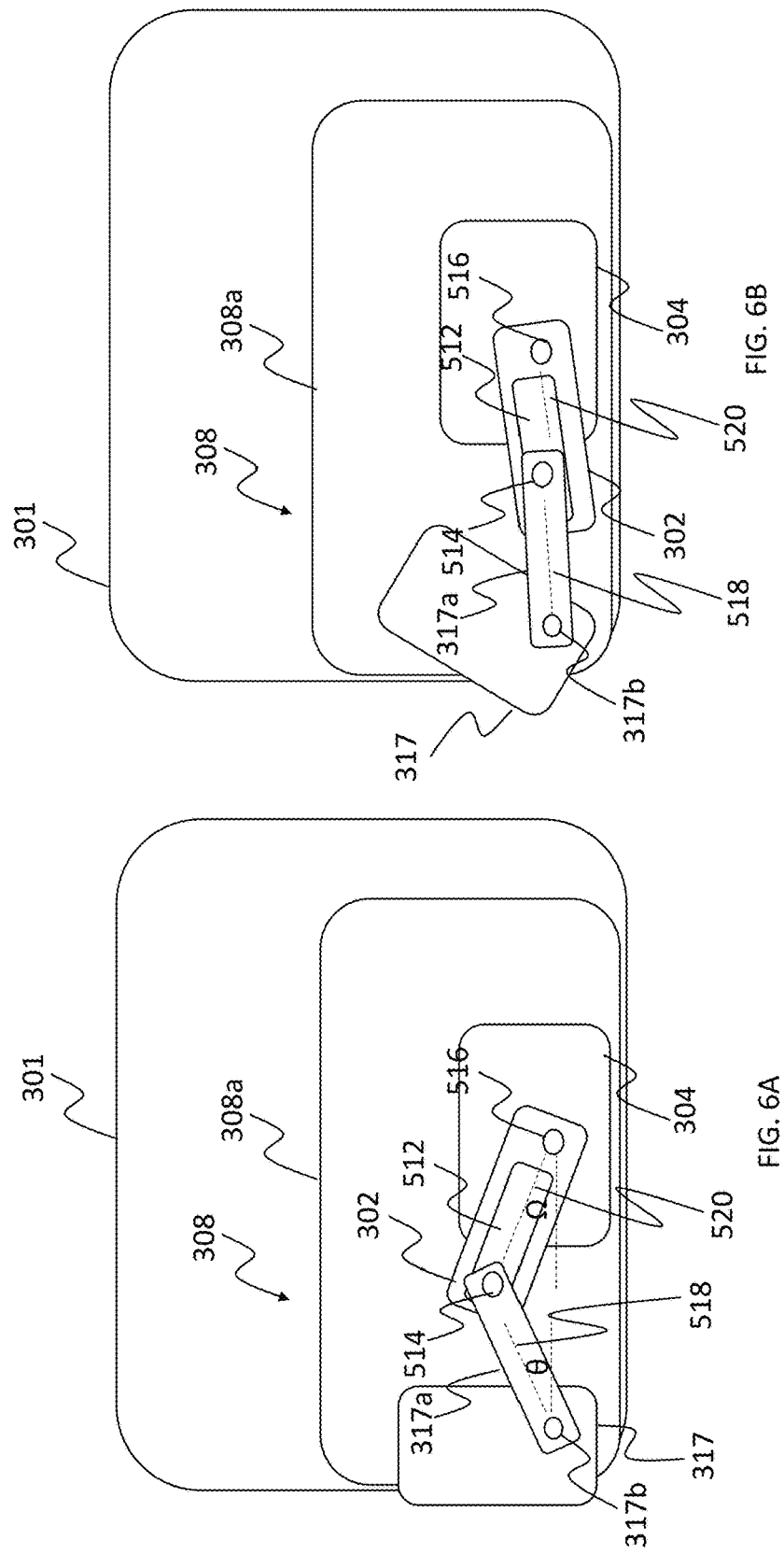

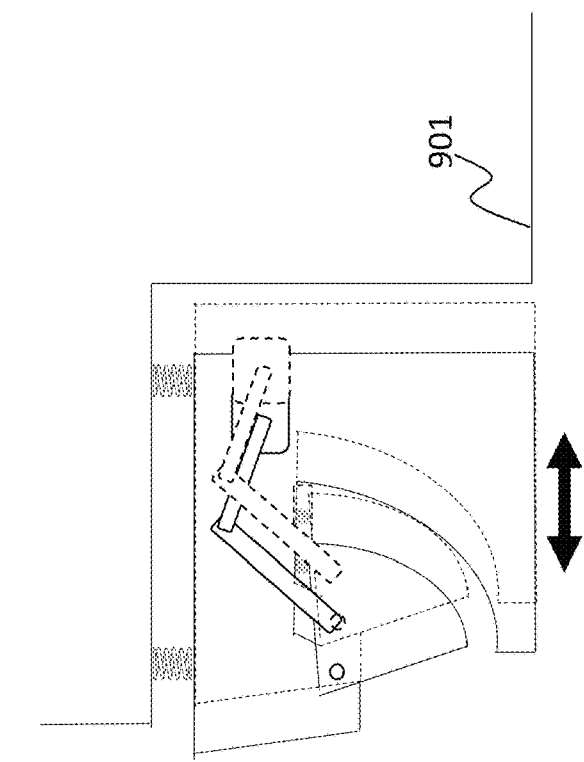
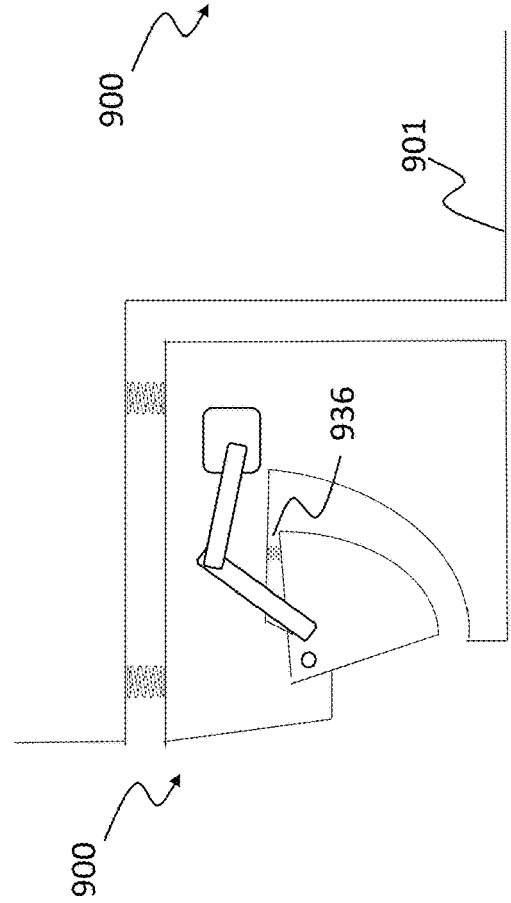

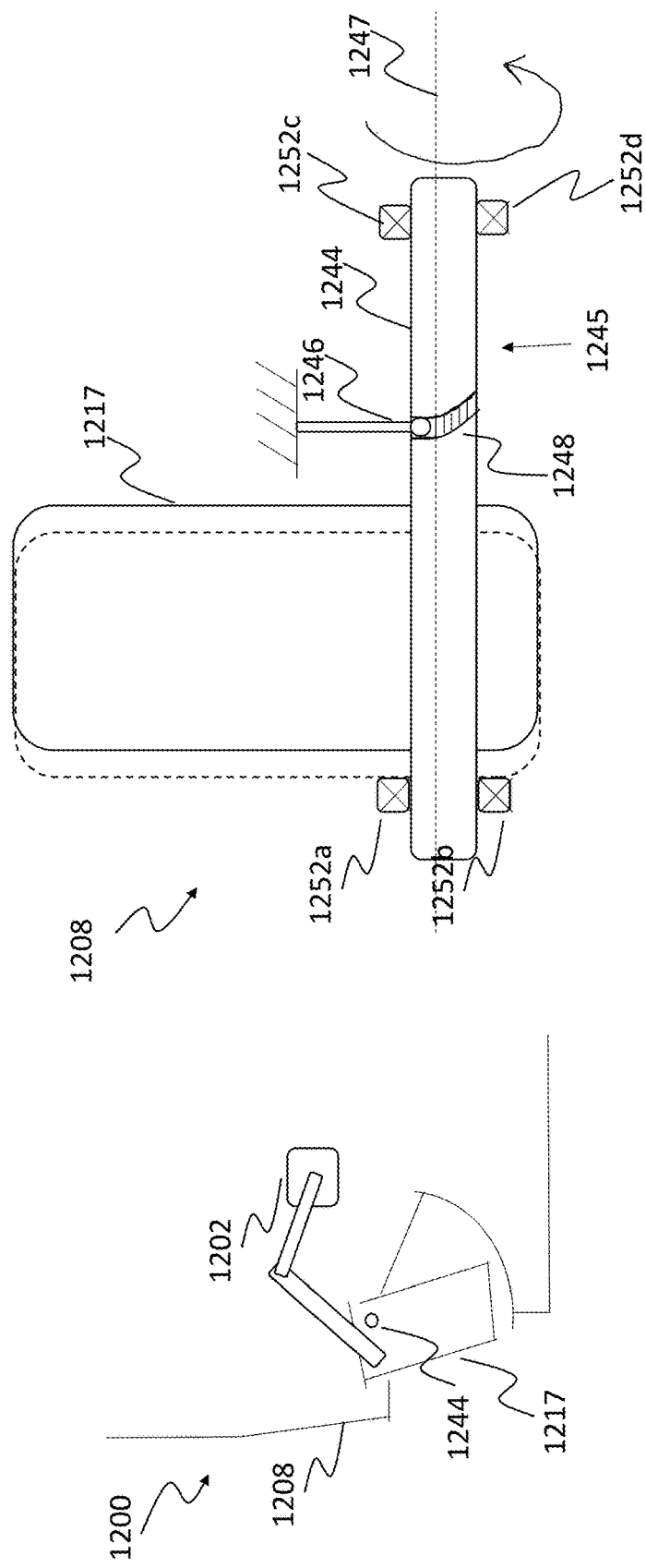

//METHODS AND APPARATUSES FOR ENDSTOP DIMINISHMENT SOLUTIONS IN HAPTICALLY-ENABLED CONTROLLER DEVICES

CROSS REFERENCE TO RELATED APPLICATIONS

This application claims the benefit of U.S. Provisional Application No. 62/363,003, filed on Jul. 15, 2016, which is incorporated by reference herein in its entirety.

FIELD OF THE INVENTION

The invention has application in user interfaces, gaming, consumer electronics, and virtual reality and augmented reality applications.

BACKGROUND

Video games and video game systems have become even more popular due to the marketing toward, and resulting participation from, casual gamers. Controller devices (e.g., video game devices or controllers) may use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed in devices to alert the user to specific events, or provide realistic feedback to user regarding interaction of the medical device with the patient at the distal end of the medical device.

A haptic feedback system may provide a kinesthetic haptic effect to a user input element. The kinesthetic haptic effect may be discernible or distinguishable from general haptic effects produced along the entire body of the controller device.

SUMMARY OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a haptically-enabled controller device comprising a controller body, a user input element, a haptic actuator, and a transmission component. The user input element is attached to the controller body and has a range of motion relative to the controller body that extends from a first position to an end stop position. The haptic actuator is located within the controller body and is configured to output a force or torque. The transmission component is connected to the haptic actuator and to the user input element. The transmission component is configured to transfer the force or torque from the haptic actuator to the user input element with a first multiplication factor when the user input element is at the first position, and to transfer the force or torque from the haptic actuator to the user input element with a second multiplication factor when the user input element is at the end stop position, wherein the second multiplication factor is higher than the first multiplication factor.

In an embodiment, the transmission component comprises a first arm, the user input element having a second arm that is connected to the first arm such that a longitudinal axis of the first arm and a longitudinal axis of the second arm are more aligned when the user input element is in the end stop position than when the user input element is at the first position of its range of motion.

In an embodiment, the first arm comprises a pivot point at which the first arm is attached to the haptic actuator, wherein the first arm is further connected to the second arm through a connecting element of the second arm, and wherein the second arm and the first arm are connected in a manner such that a length from the pivot point to the connecting element decreases as the user input element moves from the first position to the end stop position.

In an embodiment, the user input element is, for instance, a trigger, button, thumbstick, joystick rotatable/translatable relative to the controller body from the first position to the end stop position.

In an embodiment, the haptically-enabled controller device further comprises a spring that extends between the trigger and the end stop position, wherein the first position corresponds to an equilibrium position of the spring.

In an embodiment, the first arm has a slot extending along the longitudinal axis thereof, and wherein the connecting element of the second arm is a pin inserted through the slot and is configured to slide within the slot toward the pivot point as the user input element rotates toward the end stop position.

In an embodiment, the haptic actuator is a motor configured to output the force or torque, wherein the force or torque is configured to rotate the first arm in a first direction, and to rotate the user input element in a second and opposite direction.

One aspect of the embodiments herein relate to a haptically-enabled controller device comprising a controller body, a user input element assembly, and a haptic actuator. In an embodiment, the user input element assembly has a housing disposed within or attached to the controller body via an elastically deformable element that allows the housing of the user input element assembly to be movable relative to the controller body. The user input element assembly has a user input element attached to the housing of the user input element assembly. The user input element has a range of motion relative to the housing that extends from a first position to an end stop position. The haptic actuator is configured to output a force or torque on the user input element assembly, wherein the elastically deformable element causes the force or torque to move the housing of the user input element assembly relative to the controller body.

In an embodiment, the elastically deformable element is or forms a spring suspension.

In an embodiment, the user input element assembly comprises a first spring located between the user input element and the housing, the first spring being configured to dampen vibration, and wherein the spring suspension attaching the housing of the user input element assembly to the controller body comprises a second spring that is stiffer than the first spring.

In an embodiment, the spring suspension comprises a spring that extends along a first axis, and the haptic actuator is configured to cause the user input element assembly to move along a second axis that is perpendicular to the first axis.

In an embodiment, the haptically-enabled controller device further comprises a transmission component connecting the haptic actuator to the user input element, the transmission component being configured to pull the user input element to the end stop position during movement of the user input element assembly.

In an embodiment, the user input element comprises a first component and a second component connected to the first component and moveable relative thereto, and wherein the haptic actuator is configured to actuate the second component relative to the first component.

In an embodiment, the first component is an outer component of the user input element, wherein the second component is an inner component of the user input element that is partially enclosed by the outer component, the inner component being connected to the haptic actuator by a transmission component.

In an embodiment, the inner component is connected to the outer component by another spring suspension.

In an embodiment, the haptically-enabled controller device further comprises a potential energy accumulator apparatus configured to convert user-applied energy on the user input element to potential energy and to store the potential energy. The potential energy accumulator apparatus is further configured to convert the potential energy into kinetic energy against the user input element to create a haptic effect when the user input element is at the end stop position.

In an embodiment, the haptically-enabled controller device further comprises a haptic control unit, wherein the potential energy accumulator apparatus is configured to convert the potential energy into kinetic energy in response to a haptic control signal from the haptic control unit. The haptic control unit is configured to output the haptic control signal in response to a determination that the user input element is at the end stop position, wherein the potential energy accumulator apparatus comprises at least one of a ratchet, a spring, a flywheel, a hydraulic apparatus or any other energy accumulator device/mechanism configured to convert user-applied energy at the user input element to potential energy.

In an embodiment, the haptically-enabled controller device further comprises a detent that is configured to engage the user input element as it is moved to the end stop position, and to deform as the user input element is moved further toward the end stop position. As the user input element is moved toward the end stop position, the mechanical detent is configured to vary a resistance force against movement of the user input element toward the end stop position One aspect of the embodiments herein relate to a haptically-enabled controller device comprising a controller body, a user input element, and a haptic actuator. The user input element is attached to the controller body via a pin, and is rotatable about a longitudinal axis thereof between a first position and an end stop position. The haptic actuator is configured to output a force or torque on the user input element. The pin is configured to cause the user input element to move along a first orientation when the user input element is being actuated by the haptic actuator and is at the end stop position, and to cause the user input element to move along a second orientation when the user input element is being actuated by the haptic actuator and is away from the end stop position, wherein the first orientation is different than the second orientation In an embodiment, the pin forms a groove that engages a follower object fixed to the user input element or to the controller body, wherein the groove causes the user input element to move along the first orientation when the user input element is being actuated by the haptic actuator and is at the end stop position, and causes the user input element to move along the second orientation when the user input element is being actuated by the haptic actuator and is away from the end stop position, wherein the first orientation is along the longitudinal axis, and the second orientation is perpendicular to the longitudinal axis.

In an embodiment, the groove has a first portion that is a radial groove completely perpendicular to the longitudinal axis of the pin, and has a second portion partially parallel with the longitudinal axis of the pin.

In an embodiment, the follower object comprises a ball that fits within the groove.

In an embodiment, when the user input element is at the end stop position, the force or torque output by the haptic actuator has at least a component that is parallel to the longitudinal axis of the pin.

In an embodiment, the user input element is a trigger, button, thumbstick, or joystick.

One aspect of the embodiments herein relate to a haptically-enabled controller device comprising a controller body, a control element, and a spring. The control element has a range of motion that extends from a first position to an end stop position. The spring is disposed within the controller body and configured, as the user input element is moved toward the end stop position, to exert a force on the user input element away from the end stop position. The spring has at least a nonlinear spring component that causes the force exerted by the spring away from the end stop position to increase in a nonlinear rate as the user input element is moved toward the end stop position.

In an embodiment, the nonlinear spring component comprises a coiled spring connected to the controller body and having windings that decrease in pitch in a direction toward the end stop position.

In an embodiment, the nonlinear spring component comprises a beam-shaped spring configured to be bent as the user input element is moved toward the end stop position and engages the beam-shaped spring, and wherein the controller body further includes a barrier structure that is configured to engage different points on the beam-shaped spring as the beam-shaped spring is bent so as to move a pivot point of the beam-shaped spring closer to a tip of the beam-shaped spring.

In an embodiment, the barrier structure is shaped as a series of steps, and is configured to engage the beam-shaped spring at edges of respective steps as the beam-shaped spring is bent as the user input element is moved toward the end stop position.

In an embodiment, the nonlinear spring component comprises a sealed cylinder having a fluid therein, wherein, as the user input element is moved towards the end stop position, the movement causes the fluid to be compressed.

In an embodiment, the nonlinear spring component comprises a rubber material.

One aspect of the embodiments herein relate to a haptically-enabled controller device comprising a controller body, a user input element, a haptic actuator, a moveable mass, a switching device, and a haptic control unit. The user input element is attached to the controller body and has a range of motion relative to the controller body that extends from a first position to an end stop position. The moveable mass is configured to output a vibrotactile haptic effect when the moveable mass is actuated by the haptic actuator. The switching device is configured to switchably engage the haptic actuator with one of the user input element and the moveable mass. The haptic control unit is in signal communication with the haptic actuator and configured to determine whether the user input element is at the end stop position. The control unit is further configured, in response to the determination that the user input element is at the end stop position, to cause the switching device to engage the haptic actuator with the moveable mass and to disengage the haptic actuator from the user input element, such that a force or torque output by the haptic actuator actuates the moveable mass to generate the vibrotactile haptic effect.

In an embodiment, the haptic actuator is a motor, and wherein the moveable mass is an eccentric rotating mass (ERM).

In an embodiment, the haptically-enabled controller device further comprises a transmission component connected to the user input element and configured to transmit any force or torque received by the transmission component to the user input element. The switching device receives the force or torque output by the haptic actuator, and comprises one or more clutches that are configured to, in response to a haptic control signal from the haptic control unit, disengage with the transmission component so that the transmission component does not receive the force or torque output by the haptic actuator, and to engage with the ERM so that the ERM receives the force or torque output by the haptic actuator.

One aspect of the embodiments herein relate to a haptically-enabled controller device comprising a controller body, a user input element, a haptic actuator, and a haptic control unit. The user input element is attached to the controller body and has a range of motion relative to the controller body that extends from a first position to an end stop position. The haptic actuator is located within the controller body and configured to output a force or torque. The haptic control unit is in signal communication with the haptic actuator and is configured to determine that a first haptic effect is to be output by the haptic actuator, and to determine whether the user input element is at the end stop position, and whether the first haptic effect exerts a force on the user input element toward the end stop position. The haptic control unit is further configured, in response to a determination that the user input element is at the end stop position and that the first haptic effect exerts a force on the user input element toward the end stop position, to select a second haptic effect that exerts a force on the user input element away from the end stop position, and to cause the haptic actuator to output the second haptic effect. The haptic control unit is further configured, in response to a determination that the user input element is not at the end stop position, or that the first haptic effect does not exert a force on the user input element toward the end stop position, to cause the haptic actuator to output the first haptic effect.

In an embodiment, the first haptic effect is a pull-style haptic effect, and the second haptic effect is a push-style haptic effect.

One aspect of the embodiments herein relate to a haptically-enabled controller comprising a controller body, a user input element, a haptic actuator, and a mechanical detent. The user input element has a range of motion relative to the controller body that extends from a first position to an end stop position. The haptic actuator is configured to output a force or torque on the user input element. The mechanical detent is configured to engage the user input element as the user input element is moved to a position at or near the end stop position.

In an embodiment, the mechanical detent is configured to engage the user input element before the user input element is moved to the end stop position, and is configured to deform if the user input element is moved further toward the end stop position.

In an embodiment, the mechanical detent comprises a snap button located on a surface of the controller body.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3 illustrates a plan schematic view of a user input element assembly, according to an embodiment hereof.

FIG. 4 illustrates a side schematic view of a user input element assembly, according to an embodiment hereof.

FIGS. 5A-5C illustrate various positions of a user input element, according to an embodiment hereof.

FIGS. 6A-6D illustrate various views of a transmission component and a user input element, according to embodiments hereof.

FIGS. 9A-9C illustrate side views of a user input element assembly attached to a controller body via an elastically deformable element, according to an embodiment hereof.

FIGS. 12 and 12A-12B illustrate a hinge structure that causes lateral displacement of a user input element, according to an embodiment hereof.

DETAILED DESCRIPTION

Figure 1A:
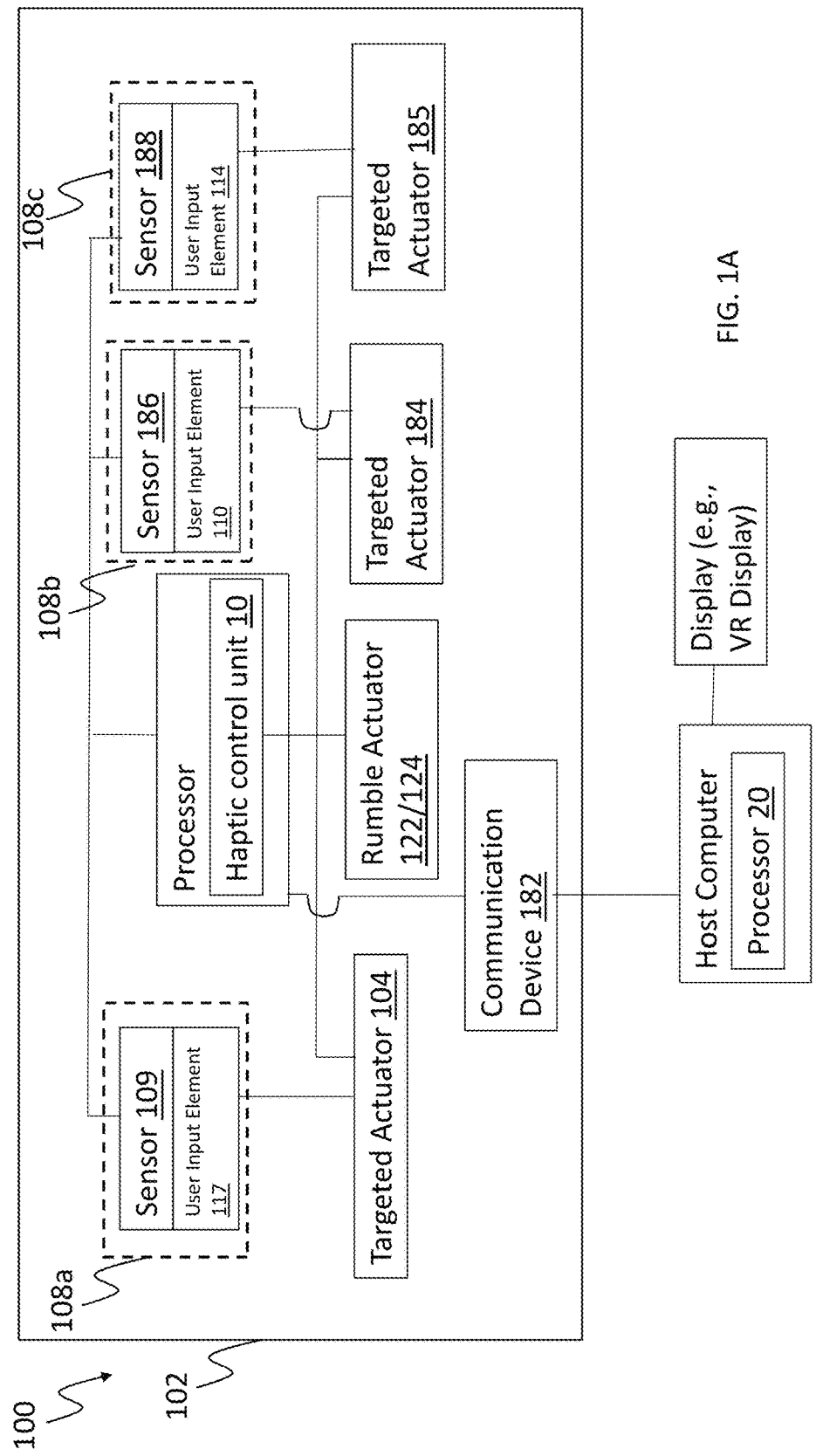
FIG. 1A illustrates a block diagram of a haptically-enabled controller device, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Specific embodiments of the present invention are now described with reference to the figures, wherein like reference numbers indicate identical or functionally similar elements.

Embodiments hereof relate to providing a haptic effect to a user input element (e.g., a trigger) in a haptically-enabled controller device (e.g., a game console controller using Immersion's Touchsense® Force design). The embodiments hereof more specifically relate to countering haptic diminishment that may occur when the user input element reaches an end stop position. This end stop position may be reached when, for example, the user input element (e.g., trigger) has been fully pulled or pressed so that it comes into contact with an end stop structure, such as a component of the controller device that obstructs further movement of the user input element in the direction of the pull or press. More generally speaking, the end stop structure may limit further movement of the user input element in one or more directions. For instance, the end stop structure may constrain the user input element from moving further inward relative to a body of the controller device. This constraint may diminish a kinesthetic haptic effect that is designed to, e.g., pull the user input element in an inward direction relative to the body of the controller device.

Embodiments hereof provide various solutions for compensating for the haptic diminishment that may occur in a user input element when the user input element is at an end stop position. Such embodiments may be implemented through mechanical structures, through a haptic control unit, or a combination thereof. Embodiments of such solutions may include:

changing a geometry of a transmission component that transfers force or torque, where the change causes more torque or force to be transferred at the end stop position than at another position;

an elastically deformable element (e.g., spring suspension) that attaches a user input element assembly to a controller body, where the elastically deformable element facilitates movement of the user input element assembly relative to the controller body;

a haptic control unit that selects which type of haptic effect to output based on whether a user input element is at an end stop position; if the user input element is at the end stop position, the control unit may select a haptic effect that does not pull the input element toward the end stop position;

providing a potential energy accumulator apparatus that can release in a controlled manner the accumulated user input energy to boost the haptic effect at the end stop position;

providing a user input element that has at least two components or portions connected to each other, where one of the components is movable relative to the other when the user input element is at an end stop position;

using a nonlinear spring or detent that engages the user input element as it moves toward the end stop position;

switching the device that receives force or torque output by an actuator, such as from the user input element to an eccentric rotating mass, when the user input element is at the end stop position;

switching to a different actuator to generate the haptic effect;

incorporating a stiffer spring in the end stop design; and switching a direction of movement of the user input element when the user input element is at an end stop position.

In an embodiment, the end stop diminishment solutions may apply to a haptic effect that is, e.g., targeted or directed kinesthetic haptic effect. The kinesthetic haptic effect may include an effect in which an actuator (e.g., a motor) applies force or torque to the user input element to move the user input element in a direction along its degree(s) of freedom. When the user input element is held against the end stop position by the user, however, the ability of the user input element to move along its degree(s) of freedom (e.g., in an inward direction) may be limited, which may diminish a kinesthetic haptic effect generated at the user input element. Embodiments hereof thus relate to compensating against the possible diminishment of a haptic effect targeted to a user input element or user input element assembly (e.g., a trigger or trigger assembly) when the user input element is at an end stop position or other end travel position.

In an embodiment, the haptically-enabled controller device may be, e.g., a gaming console controller or other peripheral controller device, a gaming tablet, a phone, a personal digital assistant (PDA), a tablet, a laptop computer, a desktop computer, or any combination thereof. The haptically-enabled controller device may include a user input element having a range of motion that extends from a first position (e.g., a first angle or first lateral position) to an end stop position (e.g., end stop angle or end stop lateral position). The user input element may be movable (e.g., rotatable or translatable) between the first position and the end stop position. In an embodiment, the first position may correspond to a position of the user input element when it is receiving no user interaction. A biasing component (e.g., a spring), for instance, may restore the user input element to the first position when the user input element is not receiving any user interaction. In an embodiment, the end stop position may correspond to a position of the user input element when it has been fully pressed or pulled, such that the user input element is in contact against an end stop structure. In an embodiment, various physical constraints (e.g., the end stop structure) may prevent the user input element from moving beyond the end stop position and from moving beyond the first position. The user input element may be configured to output a control signal based on a position of the user input element within its range of motion. Examples of the user input element include a trigger, a button, and a digital stick (e.g., joystick or thumb stick).

Figure 1B:
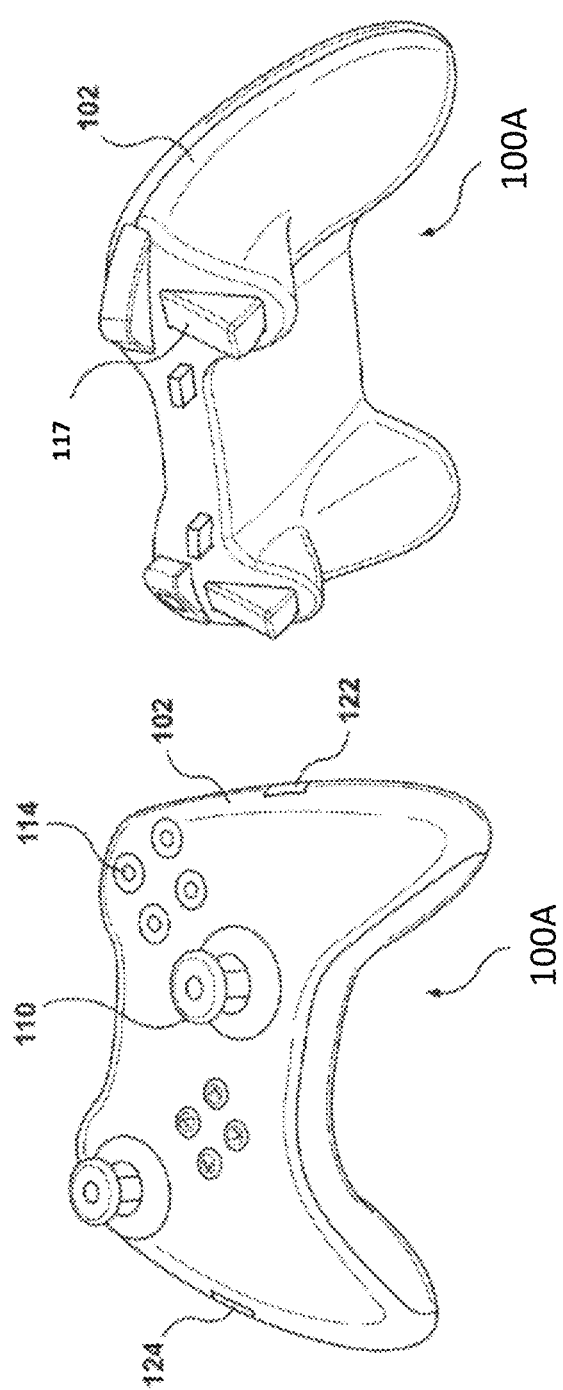
FIG. 1B is a perspective view of a haptically-enabled controller device that is a peripheral gaming console controller, according to an embodiment hereof.

FIG. 1A illustrates an example block diagram of a haptically-enabled controller device 100. Controller device 100 may, in an embodiment, be used with a gaming system that may be connected to a computer, mobile phone, television, or other similar device, or with any other application. The controller device 100 may include a controller body 102. The device 100 further includes user input elements 110, 114, 117 (e.g., a digital stick, button, trigger), and haptic actuators such as rumble actuators 122, 124 and/or targeted actuators 104, 184, 185. The targeted actuators 104, 184, 185 may be disposed in a user input element assembly (e.g., 108*a*, 108*b*, 108*c*), and may target a haptic effect to a user input element (e.g., 117, 110, or 114) in the user input element assembly. The controller device 100 may further include a haptic control unit 10 (e.g., a local processor) configured to control haptic effects generated on or in the haptically-enabled controller device 100. In an embodiment, the controller device 100 may be a handheld controller device, where controller body 102 of controller device 100 may be shaped to easily accommodate two hands gripping the device, either by a left-handed user or a right-handed user. For instance, the controller device 100 may be a handheld controller device that is a peripheral gaming console controller 100A illustrated in FIG. 1B. In the embodiment of FIG. 1B, the user input element 117 may be a trigger, the user input element 114 may be a button, and the user input element 110 may be a joystick. Those skilled in the art would recognize that controller device 100A is merely an exemplary embodiment of a controller device of similar shape and size to many "gamepads" currently available for video game console systems, and that controllers with other configurations of user input elements, shapes, and sizes may be used, including but not limited to controller devices such as a Wii™ remote or Wii™ U controller, Sony® SixAxis™ controller or Sony® Wand controller, as well as controller devices shaped as real life objects (such as tennis rackets, golf clubs, baseball bats, and the like) and other shapes. The user input element is movable by a user (e.g., a user can press or squeeze the user input element). In an embodiment, the user input element is free to move when a haptic actuator is not activated. Further, the position of the user input element may be reversible. For instance, after a user is done pressing, squeezing, or otherwise moving a user input element, the user input element may be able to revert to a position (e.g., a default position) that the user input element had before being pressed, squeezed, or otherwise moved by the user. This reversibility may be implemented with, e.g., a biasing spring that may return the user input element to the default position (e.g., an equilibrium position).

In an embodiment, the controller device 100 may be configured to communicate with a host computer via a wired or wireless connection. For instance, the controller device 100 may have a communication device 182 configured to communicate with a processor 20 in a host computer executing an application, such as a virtual reality (VR) game or an augmented reality (AR) game or any games in a phone/television/console/computer.

In an embodiment, the targeted actuators 104, 184, and 185 may provide, e.g., kinesthetic haptic feedback to the respective user input elements 117 (e.g., a trigger), 110 (e.g., a joystick), and 114 (e.g., a button). In an embodiment, each of the targeted actuators may be a motor which is located in a respective user input element assembly 108*a*, 108*b*, 108*c*. The user input element assembly (e.g., 108*a*, 108*b*, 108*c*) may be an assembly that is mechanically isolated from the rest of the controller body. In an embodiment, the controller device 100 may further include rumble actuators 122, 124 that provide, e.g., a rumble haptic effect. These haptic actuators 122, 124, 104, 184, 185 may be in communication with the haptic control unit 10 (e.g., a processor) that controls the actuators. The user input elements 110, 114, 117 may be used to output a control signal (e.g., application control signal) for controlling a game or other application. The control signal may be indicative of and based on a position of a user input element 110, 114, or 117. For instance, the signal may be proportional to the position of the user input element 110, 114, or 117, or may indicate whether the position of the user input element 110, 114, or 117 has moved past a defined threshold. The position of the user input element 117, 110, or 114 may be determined using a position sensor 109, 186, or 188. In an embodiment, the controller device 100 may comprise a communication device 182, which may be used to communicate the control signal to a processor 20 executing an application (e.g., an AR/VR application), such as to a processor in a host computer. In an embodiment, the haptically-enabled controller device 100 may omit various elements illustrated in FIG. 1A, such as some of the sensors (e.g., 186, 188), some of the user input elements (e.g., 110, 114), some of the targeted actuators (e.g., 184, 185), the communication device 182, and/or the rumble actuators 122, 124.

In an embodiment, the haptically-enabled controller device 100 may be used to provide a haptic effect for a virtual reality (VR) space provided by a VR application, and/or for an augmented reality (AR) space provided by an AR application. For example, the controller device 100 may be an AR device that provides an augmented reality environment in which physical objects in a physical space are concurrently displayed with virtual objects in a virtual space. In the example, the AR device (e.g., a gamepad) may have an integrated display that displays one or more virtual objects in a view that includes physical objects augmented with the virtual objects. The virtual objects may be based on recognizing specific codes (e.g., QR codes) disposed on physical objects, or on recognizing specific, known physical objects using image recognition such as by transmitting images to a server that performs the image recognition. In an embodiment, the haptically-enabled controller device 100 may be a peripheral device which communicates with a processor executing an AR application, and may have a display or may lack a display. The processor communicating with the controller device may be integrated with a display that displays a view of physical objects augmented with virtual objects, or may be separate from such a display. For example, the display may be a head-mounted display, a tablet computer, or a vehicle dashboard display, and the processor may be integrated into those displays or may be part of a separate computer in communication with those displays. In the above examples, the controller device 100 may be used to provide control signals to the AR application.

In an embodiment, the haptically-enabled controller device 100 may be a VR device. The VR device may provide a virtual world environment in which a user of the VR device is represented in the virtual world environment as an avatar, and the user may control movement of the avatar within the virtual world environment. The VR device may be, e.g., a wearable device such as a head-mounted display. In an embodiment, the haptically-enabled controller device 100 may be a peripheral device which communicates with a processor executing a VR application. The processor communicating with the controller device may be integrated with a display that provides a VR environment, or may be separate from such a display. For example, the display may be a head-mounted display (e.g., Oculus Rift® VR Headset), and the processor may be integrated into those displays or may be part of a separate computer in communication with those displays. In the above examples, the controller device may be used to provide control signals to the VR application.

In an embodiment, the haptically-enabled controller device 100 may be a wearable device, such as a head-mounted display, a wrist-mounted device, or other wearable device having one or more user input elements that can output control signals for an application (e.g., a VR or AR application).

Figure 2A:
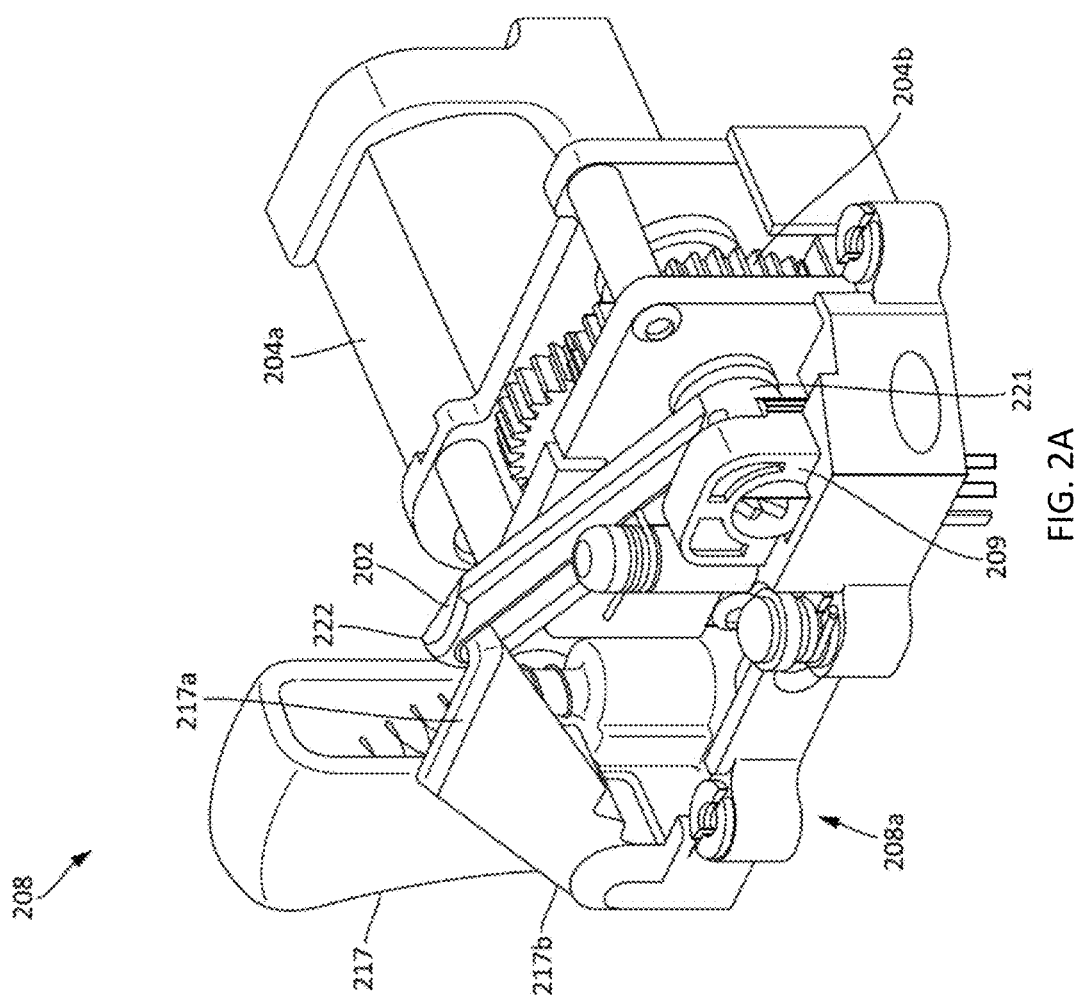
FIGS. 2A and 2B illustrate a perspective view and a side view, respectively, of a user input element assembly, according to an embodiment hereof.
Figure 2B:
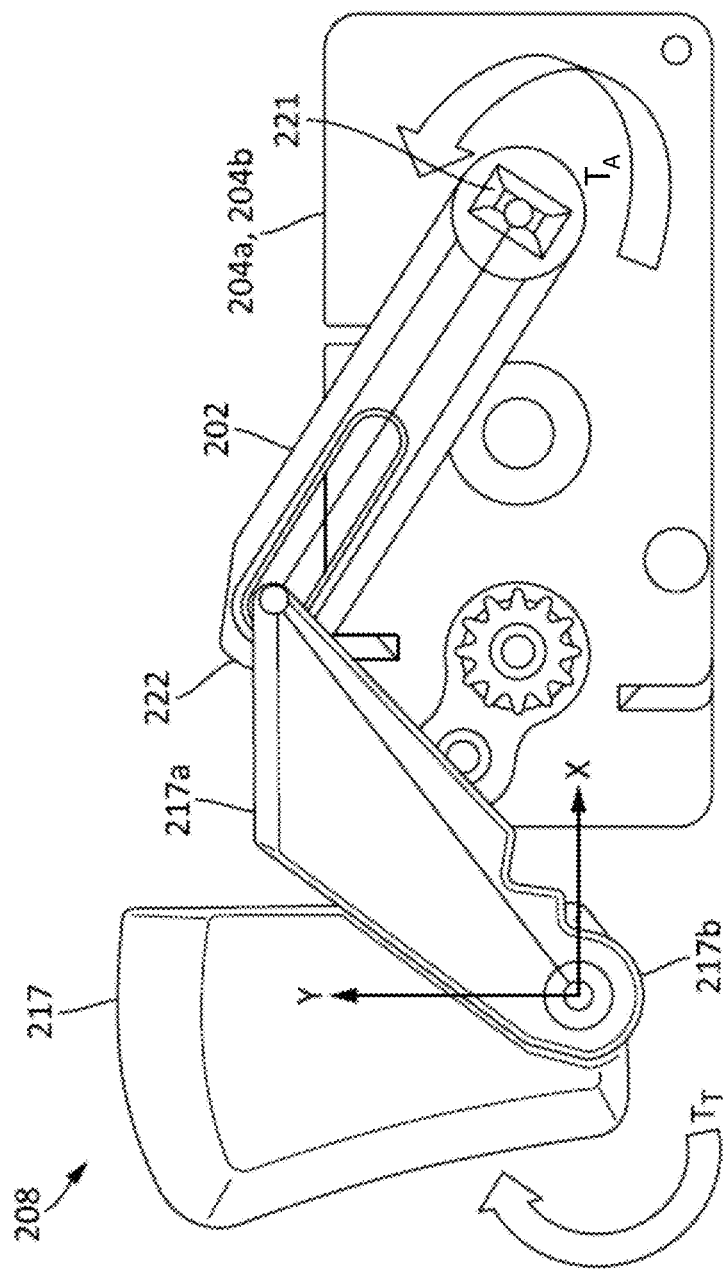

FIGS. 2A and 2B illustrate a user input element assembly 208, and more specifically a trigger assembly that is located within or otherwise attached to a controller body of a haptically-enabled controller device (e.g., a controller body 102 of device 100). The user input element assembly 208 has a housing 208a and is configured to generate a haptic effect (e.g., a directed or kinesthetic haptic effect) at a user input element 217 (e.g., a trigger). The housing 208a may have an end stop structure that forms a barrier to restrict movement of the user input element 217, and that partially defines a range of motion of the user input element 217. For instance, the end stop structure may comprise, e.g., a base and a spring wound around the base. The spring may or may not be connected to the user input element 217, and may be configured to bias the user input element 217 to a first position (e.g., an equilibrium position or nominal position) when there is no user interaction or other force applied to the user input element 217. In an embodiment, the housing 208a of the user input element assembly 208 may be a supporting substrate or platform on which components of the user input element assembly 208 are mounted. The supporting substrate or platform may be disposed within the controller body (e.g., 102), which may form another housing that encloses the user input element assembly 208.

In an embodiment, the user input element 217 may have a lever arm 217a and a hinged end 217b. The hinged end 217b may form a pivot point to which the user input element 217 is attached to the housing 208a of the user input element assembly 208. The user input element 217 may be configured to rotate about the pivot point at the hinged end 217b, within a range of motion that is between the first position and an end stop position. End stop positions are discussed in more detail below.

In an embodiment, the user input element assembly 208 further includes a haptic actuator, such as the combination of a motor 204a and a gearbox 204b, which is configured to output a force or torque. The user input element assembly 208 further includes a transmission component 202 that is configured to transfer the force or torque to the user input element 217. In the illustrated embodiment, the transmission component 202 may be a lever arm having a hinged first end 221 that forms a pivot point for the transmission component 202 to rotate. The transmission component 202 may further have a moveable second end 222. The user input element 217 may be attached to the moveable second end 222 of the lever arm of the transmission component 202, while a position sensor 209 is attached to the hinged first end 221 of the lever arm of the transmission component 202. The position sensor 209 may detect a change in the rotational position of the lever arm of the transmission component 202, and/or a change in the rotational position of the user input element 217. The position sensor 209 may be implemented through a potentiometer, an optical sensor, an optical encoder, a hall-effect sensor, a capacitive sensor, another type of position sensor, or any combination thereof. The transmission component 202 may allow the user input element 217 to move from the end stop position to the first position, but may constrain the user input element 217 from moving beyond the first position. In an embodiment, the transmission component 202 may rely on a friction drive mechanism.

In an embodiment, the transmission component 202 may transfer the force or torque output by the haptic actuator 204a, 204b to the user input element 217 with various multiplication factors. The multiplied force or torque may be transferred to a lever arm 217a of the user input element 217. The lever arm 217a may be fixed relative to the rest of the user input element 217, so that movement (e.g., rotation) of the lever arm 217a will cause a same amount of movement (e.g., same degree of rotation) in the rest of the user input element 217.

FIG. 2B illustrates the transmission component 202 transferring a torque $T_A$, which is a torque output by haptic actuator 204a, 204b, to the lever arm 217a of the user input element 217. The resulting torque that is delivered to the user input element 217 may be denoted $T_T$. When the torque $T_A$ corresponds to the illustrated counterclockwise rotation output by the haptic actuator, a pull-style haptic effect may be felt at the user input element 217. That is, the torque $T_A$ may be transferred to the user input element 217, which may experience a torque $T_T$ that causes it to rotate in a clockwise direction. The haptic effect resulting from such a torque $T_T$ may be referred to as a pull-style haptic effect because the torque $T_T$ pulls the user input element 217 toward the rest of the user input element assembly 208. In an embodiment, this torque $T_T$ may result in a force that pulls the user input element 217 toward an end stop position. In an embodiment, when the torque $T_A$ corresponds to a clockwise rotation, the user input element 217 may experience a torque $T_T$ that causes it to rotate in a counterclockwise direction. The haptic effect corresponding to this rotation may be referred to as a push-style haptic effect because the torque $T_T$ may push the user input element 217 away from the rest of the user input element assembly 208. In an embodiment, this torque $T_T$ may result in a force that pushes the user input element 217 away from an end stop position.

FIGS. 3 and 4 illustrate schematic views of another embodiment of a user input element assembly 308, and more specifically a trigger assembly, in a controller body 301 of a haptically-enabled controller device 300. FIG. 3 shows a plan schematic view of the user input element assembly 308, while FIG. 4 illustrates a side schematic view. The user input element assembly 308 includes a housing 308a and a haptic actuator 304 which may output a force or torque, which may rotate a shaft 307 along an axis of rotation 306. In an embodiment, the controller body 301 may be formed from a housing (e.g., a plastic shell) that is a first housing for containing components of the haptically-enabled controller device 300. In this embodiment, the housing 308a of the user input element assembly 308 may be a second housing for containing components of the user input element assembly 308. Further in this embodiment, the second housing may be disposed within the first housing.

In an embodiment, the user input element assembly 308 further includes a user input element 317 (e.g., a trigger), which is attached (directly or indirectly) to the controller body 301, such as at a hinged end 317b, see FIG. 4, of the user input element 317. The hinged end 317b may form a pivot point about which user input element 317 can be rotated by a user. That is, the user input element 317 may be rotatable about hinged end 317b, and relative to the controller body 301 and/or user input element 308, within a range of motion that extends from a first position to an end stop position. The user input element 317 may be configured to output a signal indicative of a position thereof within its range of motion. In an embodiment, the user input element 317 may have a lever arm 317a (see FIG. 4). The torque output by the actuator 304 may be transferred by a transmission component 302 to user input element 317. More specifically, the torque may be transferred by transmission component 302 to the lever arm 317a of the user input element 317 (see FIG. 4). A position sensor 309 may, e.g., measure an angle of rotation of transmission component 302, which may be used to calculate the amount or degree of rotation of user input element 317. In this illustrated embodiment, a control unit 310 (e.g, a processor) may be in signal communication with the haptic actuator 304 and sensor 309 and configured to communicate haptic control signals to haptic actuator 304 to control, e.g., the direction and/or amount of force or torque that is outputted.

As discussed above, a user input element may have a range of motion from a first position to an end stop position. A user input element may, in some cases, be unable to move outside this range of motion, because of an end stop structure or other barrier at those positions that prevent further movement. FIG. 5A illustrates user input element 317 at a first position in its range of motion. This position may be defined by a value of an angle θ (e.g., 37°) that is defined relative to, e.g., a base of the user input element assembly. In some embodiments, the user input element 317 may be biased to this position (e.g., with a spring), such that it reaches this position when no user force is applied to the user input element 317. Thus, in some cases, the first position may be an equilibrium position (which may also be referred to as a nominal position or resting position) of the user input element 317.

FIG. 5B illustrates a user input element 317 at an end stop position, corresponding to a situation in which the user input element 317 has come in contact with an end stop structure 402 at a base of the user input element assembly. This may be defined by a value (e.g., 0°) that is defined relative to, e.g., a base of the user input element assembly.

As shown in FIG. 5C, the end stop position may occur at other values of the angle θ. In the figure, the end stop structure may include the biasing spring mentioned above. The end stop position may be a position at which the biasing spring has been fully compressed by the user input element 317, and prevents further movement by the user input element 317 against the spring.

Embodiments Relating to Changing Geometry of Transmission Component:

Some embodiments for compensating against haptic diminishment at an end stop position may involve changing a geometry of a lever arm or other transmission component to ensure that more torque is transferred to a user input element when it is at the end stop position. As discussed in more detail below, a user input element and a transmission component may be connected in a manner in which a lever arm of the transmission component is configured to transfer the force or torque with a first multiplication factor when the user input element is at the first position, and to transfer the force or torque with a second multiplication factor when the user input element is at the end stop position, wherein the second multiplication factor is higher than the first multiplication factor.

More specifically, in an embodiment, the transmission component may comprise a lever arm mechanism. The lever arm mechanism may include a lever arm that is connected to an output shaft of a gearbox. The lever arm may multiply a torque output of the gearbox with a multiplication factor, and apply the multiplied torque to the user input element (e.g., a trigger). The lever arm mechanism may vary a geometry between the lever arm of the transmission component and the user input element, as the user input element moves from a first position (e.g., first end) in its range of motion to an end stop position (e.g., a second end) of its range of motion. The variable geometry may produce a non-linear force across the range of motion of the user input element. More specifically, the variable geometry may cause the multiplication factor to change as the user input element moves from a first end to a second end of its range of motion. At a first end of the user input element's range of motion, the multiplication factor may be, e.g., about 0.5. At three-quarters of the way from the first end to a second end its range of motion, the multiplication factor may be, e.g., about 1.6. At the second end of the range of motion, the multiplication factor may be, e.g., 1.25. This modification of the geometry of the lever arm mechanism may achieve a higher multiplication factor of the gearbox torque while the user input element (e.g., trigger) is at its end travel position, such as at a position in which the trigger is fully depressed. In an embodiment, the torque or force on the user input element may vary in a nonlinear fashion as a function of a position of the user input element. In an embodiment, the torque or force on the user input element may vary in a linear fashion as a function of a position of the user input element.

Figure 6D:
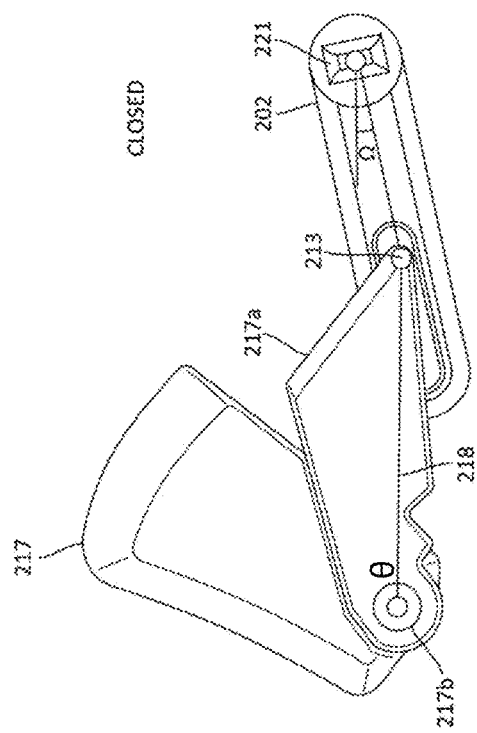

FIGS. 6A-6D illustrate embodiments in which a geometry between a transmission component and a user input element changes during movement of the user input element. More specifically, FIGS. 6A and 6B depict the user input element assembly 308 located within the controller body 301. The user input element assembly 308 may comprise the housing 308a and the user input element 317 that has a range of motion relative to the controller body 301 and/or the user input element assembly 308 from a first position (as illustrated in FIG. 6A) to an end stop position (as illustrated in FIG. 6B). As further depicted in FIGS. 6A and 6B, transmission component 302 may transfer a torque or force output by haptic actuator 304 to user input element 317. In the illustrated embodiment, the user input element 317 may comprise a lever arm 317a that is connected by a connecting element 514 to a transmission component 302, which may also comprise a lever arm. The torque or force from the actuator 304 may be transferred to the user input element 317 via the connecting element 514.

In the arrangement of FIGS. 6A and 6B, the transmission component 302 may be configured to transfer the torque or force output by actuator 304 to the user input element 317 with a multiplication factor that is greater when the user input element is at the end stop position than when the user input element is at another position within its range of motion. For instance, the geometry between the transmission component 302 (e.g., a lever arm) and the lever arm 317a of the user input element 317 may be configured to increase the multiplication factor of the transfer of force or torque as the user input element 317 moves closer to the end stop position. The user input element 317 may be moving closer to the end stop position by decreasing a value of θ, which is an angle between a longitudinal axis 518 of the arm 317a of the user input element 317 relative to a base of the user input element assembly 308. In a more specific embodiment, the transmission component 302 may be a lever arm, and the geometry between this lever arm and the lever arm 317a of the user input element 317 may change in a way such that, as θ decreases, the value of Ω (which measures an angle between a longitudinal axis 520 of the lever arm of the transmission component 302 and a base of the user input element assembly 308) also decreases. In other words, as the user input element 317 moves closer to an end stop position, the longitudinal axis 518 and the longitudinal axis 520 of, respectively, the user input element's lever arm 317a and the transmission component 302's lever arm may become more aligned, as depicted in FIG. 6B. This increased alignment depicted in FIG. 6B may result in the transmission component 302 pushing or pulling on the lever arm 317a in a direction substantially perpendicular to the lever arm 317a, which may maximize the amount of torque that is exerted on the lever arm 317a, and thus on the user input element 317.

In an embodiment, as depicted in FIGS. 6A and 6B, the lever arm of the transmission component 302 may be connected to the haptic actuator 304 at a hinged end 516 of the lever arm. The hinged end 516 may form a pivot point about which the lever arm of the transmission component 302 rotates. In an embodiment, a length between the pivot point at the hinged end 516 and the connecting element 514 may decrease as the user input element 317 moves toward an end stop position. In an embodiment, as depicted in FIGS. 6A and 6B, this results from a transmission component 302 (e.g., lever arm) that has a slot 512, and the connecting element 514 may form a pin that is inserted through the slot 512, and may be slidable within the slot 512 as the user input element 317 is rotated toward its end stop position. That is, the rotation of the user input element 317 may cause the connecting element 514 to slide within the slot 512 in the transmission component 302. As the user input element 317 is rotated toward the end stop position depicted in FIG. 6B, the connecting element 514 slides in the slot 512 closer to the pivot point of the transmission component 302 at the hinged end 516 thereof, thus shortening the length from the pivot point to the connecting element 514.

Figure 6C:
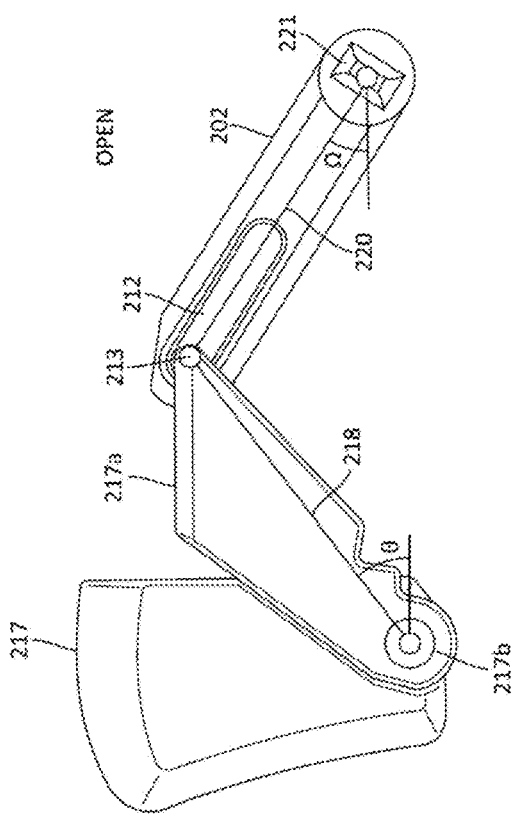

FIGS. 6C and 6D also illustrate a pin and slot configuration for a user input element 217 and a transmission component 202. More specifically, as illustrated in FIG. 6C, the user input element 217 may be attached to a housing 208a (see FIG. 2A) of a user input element assembly 208 via a hinged end 217b of the user input element 217. The hinged end 217b may form a pivot point about which the user input element 217 is rotated, from a first position to an end stop position. The lever arm 217a of the user input element 217 may be connected to the transmission component 202 through a slot 212 in the transmission component 202. The slot 212 may extend along a longitudinal axis 220 of the transmission component 202. The lever arm 217a of the user input element 217 may be connected to the transmission component 202 via a pin 213 or other connecting element that is formed at an end of the lever arm 217a, where the pin 213 is inserted through the slot 212 to form a connection point. The pin and slot configuration allows the pin 213 to be slidable within the slot 212.

FIG. 6C further illustrates an embodiment in which the user input element 217 is in a trigger in an open configuration, which may be a configuration in which the trigger is not being pressed. In the open configuration, the length from the pin 213 to a pivot point at the hinged end 221 may have a maximum value. Further in the open configuration, the longitudinal axis 218 of the lever arm 217a and the longitudinal axis of the transmission component 202 may be unaligned. In an embodiment, the open configuration may correspond to the angle θ between the longitudinal axis 218 and a base of the user input element assembly 208 shown in FIG. 2A having a value of substantially 45 degrees, and the angle Ω between the longitudinal axis 218 and a base of the user input element assembly 208 having a value of between 30 and 45 degrees.

FIG. 6D further illustrates an embodiment in which the user input element 217 is a trigger in a closed configuration, which may be a configuration in which the trigger has been fully pressed. In the closed configuration, the length from the pin 213 to a pivot point at the hinged end 221 may have a minimum value, or be close to a minimum value. Further in the closed configuration, the longitudinal axis 218 of the lever arm 217a and the longitudinal axis 220 of the transmission component 202 may be substantially aligned. In an embodiment, the closed configuration may correspond to the angle θ having a value of substantially 0 degrees, and the angle Ω having a value of between 0 and −15 degrees.

Figure 7:
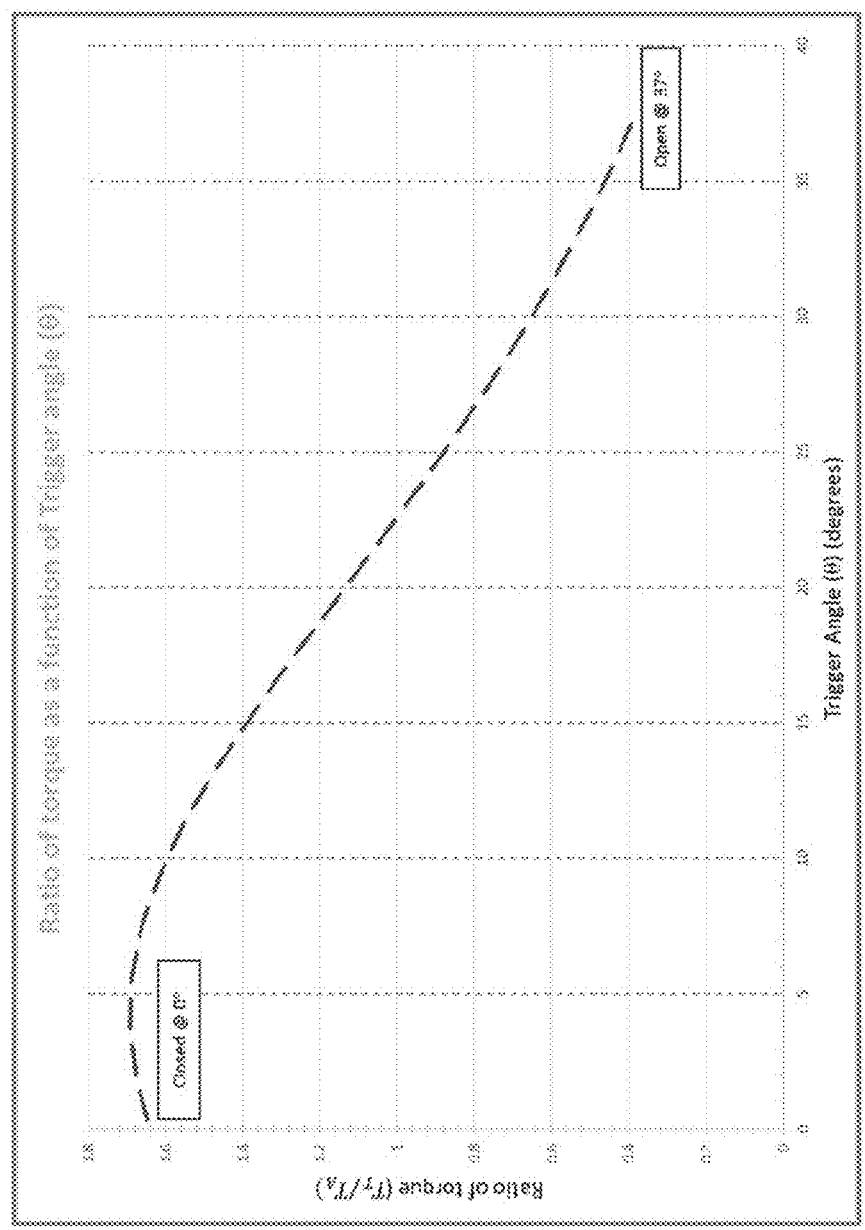
FIG. 7 illustrates a graph of example multiplication factor values as a function of a position of the user input element, according to an embodiment hereof.

In FIGS. 6A-6D, torque may be transferred from an actuator to a user input element with a multiplication factor of that is expressed as $T_T/T_A$ as depicted previously in FIG. 2B. FIG. 7 illustrates an example relationship of how the multiplication factor changes as a function of a position θ of the user input element 217/317. In the embodiment illustrated therein, the multiplication factor may be close to a maximum value when θ is at the end stop position (i.e., a factor of 1.64 at θ=0°), and is greater than the multiplication factor at other positions, such as, for instance, a factor of 1.4 at θ=15°. In an embodiment, when the user input element is at the open position, the multiplication factor is less than 0.5, and when the user input element is at the end stop position, the multiplication factor is more than 1.

Embodiments Relating to Switching Coupling of Torque from User Input Element to ERM Apparatus:

Some embodiments for compensating against haptic diminishment at an end stop position provide a mechanism that can, at an end stop position (also referred to as an end travel position), switch from transferring torque to a user input element to transferring torque to another haptic actuator mechanism, such as an eccentric rotating mass or an LRA. The eccentric rotating mass may be in a less constrained position and have greater freedom of movement than the user input element in the end stop position. The mechanism may thus switch between movement of the user input element and movement of an eccentric rotating mass (ERM). In an embodiment, the ERM may excite the whole controller body. Alternatively, if the user input element assembly is mounted on a suspension or otherwise isolated from the rest of the controller body, the user input element may excite only the user input element assembly when the trigger button or other user input element is fully depressed to the end stop position. To switch between the user input element and the ERM, a switching device located at the output of the actuator can disengage the user input element from the actuator and engage the ERM to the actuator. In an embodiment, the switching device may perform the switching under the control of a control unit, which may trigger the switching when the user input element is at an end stop position. In an embodiment, the control unit may determine the position of the user input element using a position sensor (e.g., an angular sensor). In an embodiment, if the switching device has engaged the actuator with the ERM apparatus, the control unit may be configured to communicate a vibration pattern that mimics the movement or other kinetic effect of the user input element to the actuator. In such an implementation, the actuator may rotate the ERM with a vibration pattern that mimics movement of the user input element. The resulting haptic effect would be a vibration of the whole controller body or only the trigger button, depending on the configuration chosen for attaching the trigger mechanism in the controller body.

More generally speaking, some embodiments relate to a haptically-enabled controller device comprising a controller body, a user input element attached to the controller body, a haptic actuator, a moveable mass, a switching device, and a haptic control unit. The user input element has a range of motion relative to the controller body that extends from a first position to an end stop position. The moveable mass is configured to output a vibrotactile haptic effect when the moveable mass is actuated by the haptic actuator. The switching device is configured to switchably engage the haptic actuator with one of the user input element and the moveable mass. The haptic control unit is in signal communication with the haptic actuator and configured to determine whether the user input element is at the end stop position. In response to the determination that the user input element is at the end stop position, the control unit may cause the switching device to engage the haptic actuator with the moveable mass and to disengage the haptic actuator from the user input element, such that a force or torque output by the haptic actuator actuates the moveable mass to generate the vibrotactile haptic effect.

Figure 8:
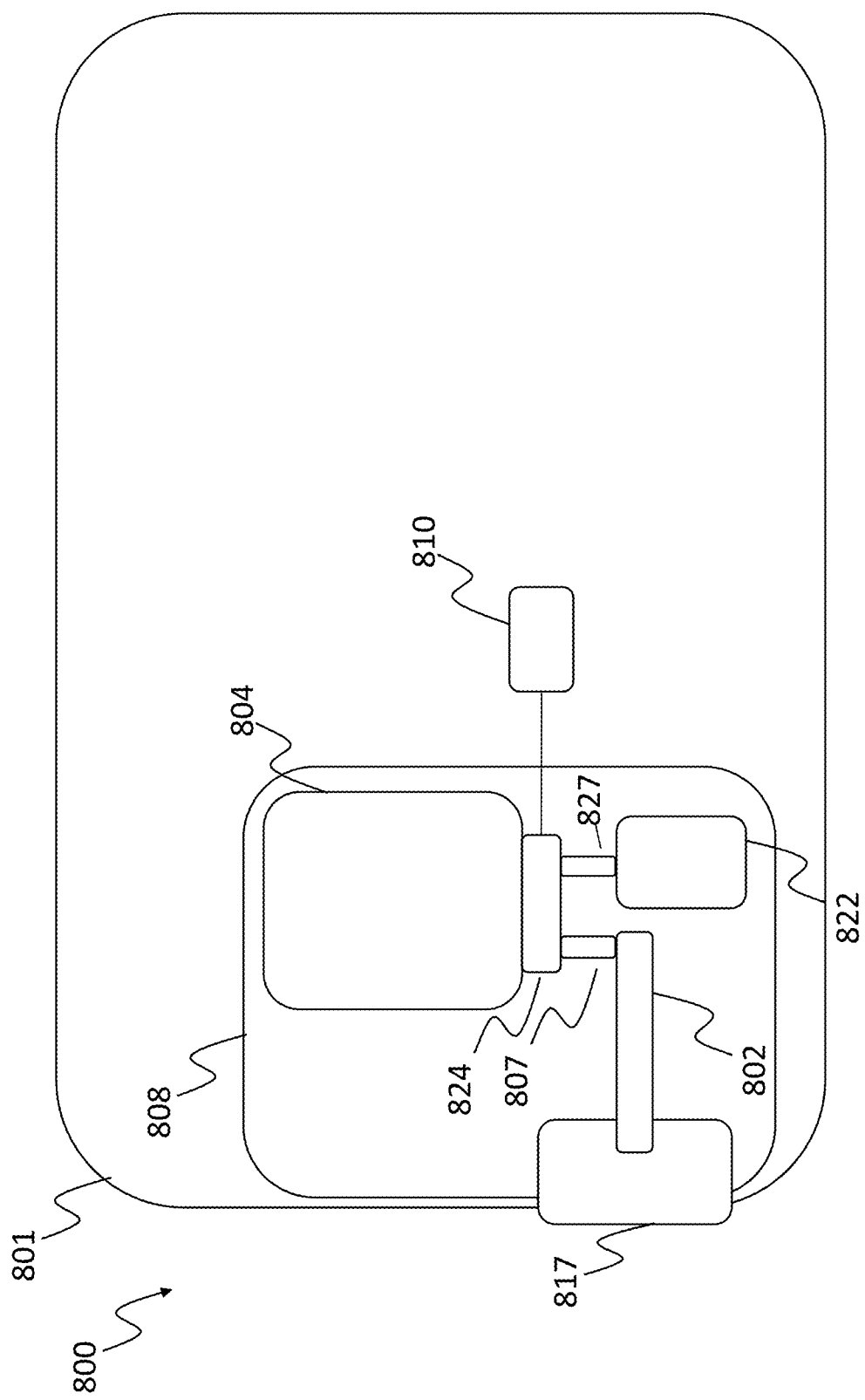
FIG. 8 illustrates a top schematic view of a user input element assembly having a switching device, according to an embodiment hereof.

FIG. 8 illustrates a controller 800 having a switching device 824 in a user input element assembly 808. In an embodiment, the switching device 824 may be located between a haptic actuator 804 and a transmission component 802 that transfers torque or force to a user input element 817, and between the haptic actuator 804 and an eccentric rotating mass (ERM) 822. The switching device 824 may uncouple the transmission component 802 from the force or torque output by the haptic actuator 804 to stop force or torque from being transferred to the transmission component 802 and the user input element 817. In an embodiment, the transmission component 802 may receive the torque or force via a rotatable shaft 807, and the switching device 824 may be configured to selectively couple the shaft 807 to or uncouple the shaft 807 from the actuator 804. In an embodiment, the switching device 824 may be configured to couple that force or torque from the actuator 804 to a shaft 827 that is connected to the ERM 822. As a result, force or torque from the actuator 804 may be transferred to the ERM 822.

In an embodiment, the ERM 822 may be part of an apparatus that comprises a flywheel which can be coupled to or uncoupled from the force or torque of the haptic actuator 804. In an embodiment, the switching device 824 may perform switching in response to a control signal from a haptic control unit 810, which may output the control signal in response to a determination that the user input element 817 is at an end stop position.

In an example, the switching device 824 has one or more clutches that are configured to disengage with the shaft 807 leading to the transmission component 802 so that it does not receive the output force or torque, and to engage with the shaft 827 leading to the ERM 822 so that the ERM 822 receives the output force or torque.

Embodiments Relating to Mounting User Input Element Assembly to a Controller Body Via an Elastically Deformable Element (e.g., a Spring Suspension):

Some embodiments for compensating against haptic diminishment include providing a whole user input element assembly (e.g., trigger assembly) that sits on an elastically deformable element or base (e.g., a spring suspension) so that the user input element assembly can move as a unit when the user input element is fully depressed relative to the assembly. The elastically deformable element may attach the user input element assembly to a controller body of a haptically-enabled controller. The controller body may be a body having a graspable structure and may house components of the handheld controller. The controller body and one or more user input element assemblies may make up the entire or substantially the entire handheld controller.

The ability of the deformable element to elastically deform allows the user input element assembly to move relative to the controller body when the two structures are attached to each other. In an embodiment, the user input element assembly includes a carriage that carries the user input element as well and the sensor and actuator. As a user presses the user input element (e.g., trigger) from a first end of the user input element's range of motion, the user input element may have considerable freedom of movement, and very little of the force from the user is transferred to the elastically deformable element (e.g., spring suspension), which may have very little movement. When the user input element reaches the end stop position, at a second and opposite end of its range of motion (where the user input element may be locked), the carriage that contains the user input element can still move relative to the rest of the controller body via the deformable element (e.g., via the spring suspension).

Figure 9A:
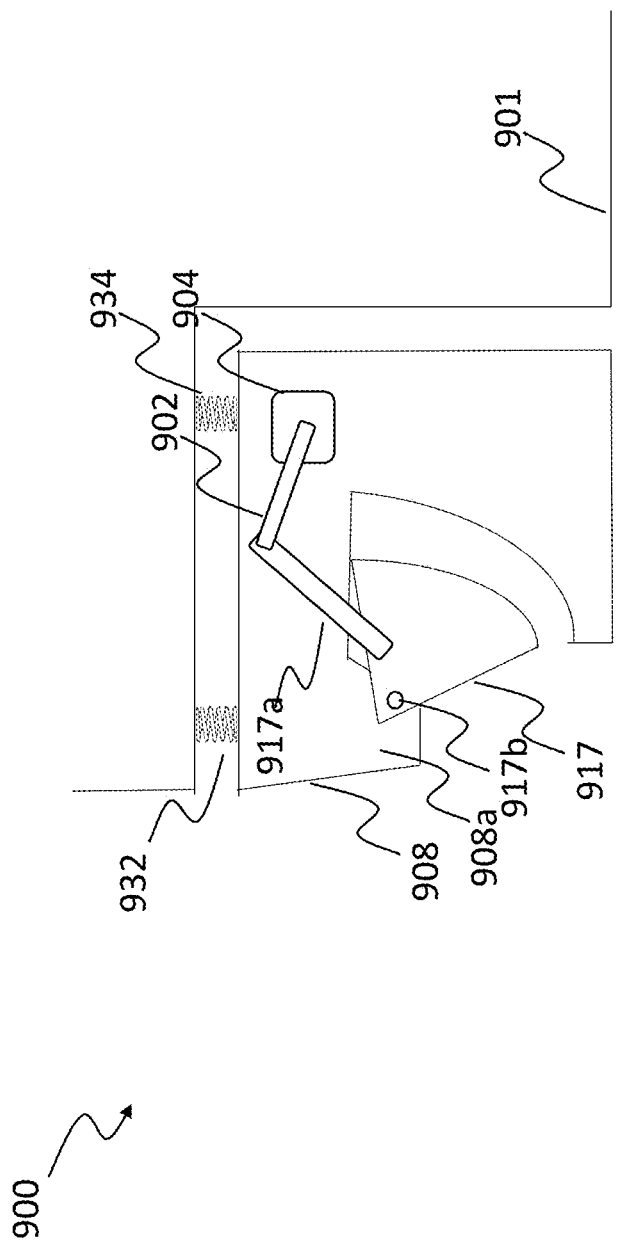

FIGS. 9A-9C depict an embodiment of a suspension-based system as an elastically deformable element. FIG. 9A illustrates a handheld controller device 900 that has a controller body 901, which may further include a user input element assembly 908. The user input element assembly 908 may itself have a housing 908a that is attached to the rest of the controller body 901 via an elastically deformable element that is a spring suspension, which includes springs 932 and 934. The housing 908a may further house a haptic actuator 904 (e.g., a motor) that outputs a force or torque. The assembly 908 may further include a user input element 917, which may be rotatable relative to the assembly 908 via a pivot point formed at a hinged end 917b of the user input element 917. A transmission component 902 (e.g., a lever arm) may connect the actuator 904 to the user input element 917, and may be used to transfer a force or torque to the user input element 917, such as via a lever arm 917a. In an embodiment, the transmission component 902 may be configured to pull the user input element 917 to the end stop position during movement of the user input element assembly 908. In an embodiment, the lever arm 917a may be a component of the user input element 917. In an embodiment, the user input element assembly 908 may further include one or more vibration filter springs 936 (FIGS. 9B and 9C). In an embodiment, the user input element may have no such vibration filter spring (FIG. 9A). In an embodiment, the user input element may further have a biasing spring, such as that shown in FIG. 2A, that biases the user input element to the first position in its range of motion. The vibration filter spring 936 and the biasing spring are different than the springs 932, 934 of the spring suspension, and do not form part of the spring suspension attaching the user input element assembly 908 to the controller body 901.

The spring suspension may allow the user input element assembly 908 to be movable relative to the rest of the controller body 901. This movement can occur even when user input element 917 has reached an end stop position. This end stop position may occur, for example, when user input element 917 has been rotated to a position in which it contacts the housing 908a of the user input element assembly 908 (FIG. 9A), which may act as an end stop position, or when user input element 917 has been rotated to a position in which it fully compresses spring 936 (FIG. 9B). In this end stop position, when a torque is output by haptic actuator 904 and is transferred by the transmission component 902 to the lever arm 917a of the user input element 917, the user input element 917 may be unable to move further relative to the user input element assembly 908. As illustrated in FIG. 9C, however, the whole user input element assembly 908 may still be moved relative to the rest of the controller body 901 to generate a haptic effect. The springs 932, 934 may extend along a first axis (e.g., a vertical axis), and the haptic actuator may be configured to cause the user input element assembly 908 to move along a second axis (e.g., a horizontal axis) that is perpendicular to the first axis.

In an embodiment in which the handheld controller 900 includes a vibration filter spring 936, the springs 932, 934 used in the spring suspension may be stiffer than the vibration filter spring 936 in the assembly 908. The springs 932 and 934 may, in some instances, have a level of stiffness such that a predetermined level of user-applied force that is expected during average usage of the handheld controller 900 would not fully compress the one or more springs 932, 934 even when the user input element 917 is rotated to the end stop position. Keeping the springs 932, 934 from a fully compressed state during normal usage of the user input element 917 may ensure that the springs 932, 934 are sufficiently flexible to allow the user input element assembly 917 to move relative to the rest of the controller body 901.

Embodiments Relating to Providing a Mechanical or Programmable Detent:

Some embodiments for addressing haptic diminishment include using a mechanical or programmable detent. The mechanical detent may be inserted at or near an end stop structure to inform a user that he or she is at or near the end stop position. This provides users with cues that they are at the end of the travel of the trigger or other user input element. These cues will inform the user that they have reached the end stop position and should not press on the trigger (or other user input element) any harder. In an embodiment, the mechanical detent can include a physical snap button that provide a detent style effect to the user as the user input element approaches the end stop position.

Figures 10A, 10B:
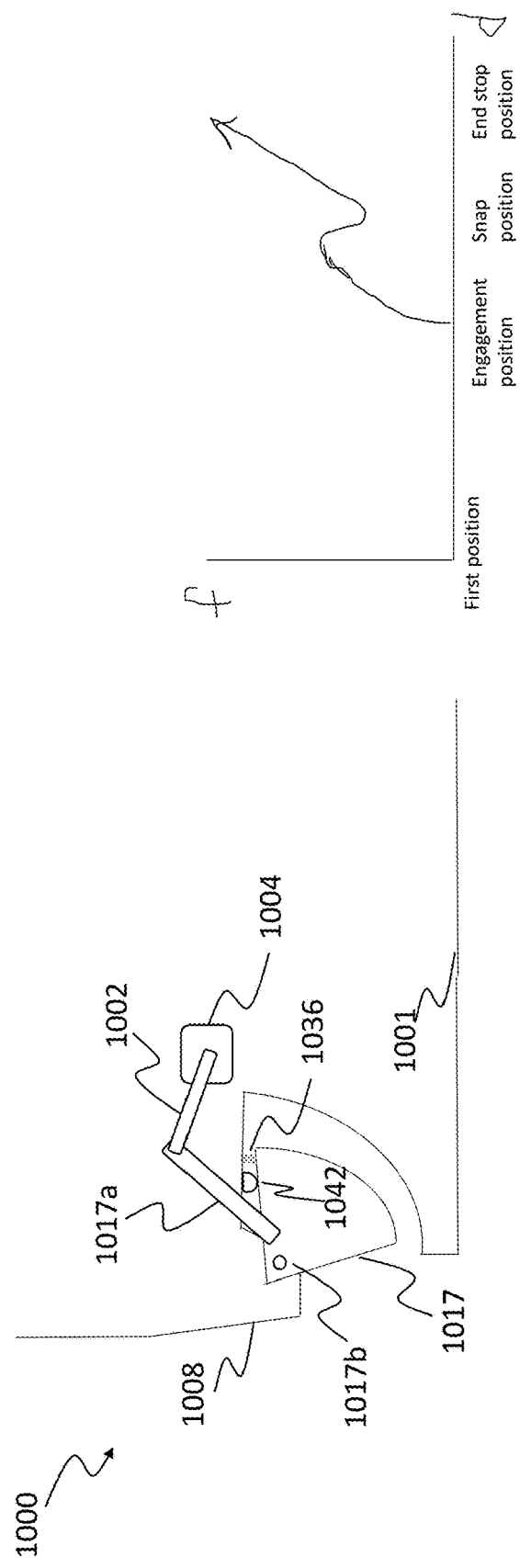
FIG. 10A illustrates a detent mechanism, according to an embodiment hereof.
FIG. 10B illustrates a force and displacement curve of a detent mechanism, according to an embodiment hereof.

FIG. 10A illustrates an embodiment of a haptic diminishment prevention solution having a mechanical detent. The figure shows a handheld controller device 1000 device having a controller body 1001, which may include a user input element assembly 1008 that is an integral part of the controller body 1001. The controller device 1000 may further include a user input element 1017 rotatable relative to the assembly 1008 via a pivot point formed at a hinged end 1017b of the user input element 1017. The controller device 1000 may further include a haptic actuator 1004, a vibration filter spring 1036, and a transmission component 1002. The transmission component 1002 may transfer a torque or force to a lever arm 1017a, which may be considered to be part of the user input element 1017. The handheld controller device 1000 further includes a mechanical detent 1042 that is configured to engage the user input element 1017 as the user input element 1017 is moved to a position at or near (e.g., at or before) the end stop position. In an embodiment, the position illustrated in FIG. 10A may be an end stop position if the vibration filter spring 1036 were fully compressed.

In an embodiment, the detent 1042 may be a snap button or other device configured to resist the user input element 1017 being pulled further toward the end stop position. This resistance force may steadily increase as the user input element 1017 is pulled toward the end stop position and steadily deforms the snap button, as illustrated in FIG. 10B. At a certain point in the deformation, referred to as a snap position in FIG. 10B, the snap button may snap inwards, resulting in a sharp decrease in the resistance force. In an embodiment, the mechanical detent 1042 may prompt a user to keep the user input element (e.g., trigger) pulled between the engagement position and the snap position.

While FIG. 10A illustrates an embodiment in which the user input element assembly 1008 is integral with the controller body 1001, in another embodiment the user input element assembly 1008 may instead be mounted on the controller body 1001 via a spring suspension or other elastically deformable element, similar to that shown in FIGS. 9A-9C. Further, while FIG. 10A illustrates a controller device 1000 that includes a vibration filter spring 1036, in another embodiment the controller device 1000 may have no vibration filter spring.

In an embodiment, the mechanical detent may be combined or replaced with a programmable detent. The programmable detent may involve, for instance, providing a haptic effect when a user input element is at or near an end stop position. The haptic effect may be generated with the same actuator as that used to actuate the user input element (e.g., actuator 1004), or with a different actuator, such as a body actuator that generates a rumble haptic effect. The programmable detent may thus also provide a cue to a user when the user has pulled the user input element to or close to an end stop position.

Embodiments Relating to a User Input Element Having at Least Two Connected Components that are Movable Relative to Each Other:

Some embodiments for compensating against haptic diminishment involve providing a user input element with at least two connected components that are movable relative to each other. These components may involve a middle component and a main component, where the middle component can move inward and outward (e.g., by 1 mm) relative to the main component, even when the user input element as a whole is at the end stop position. This can create a hammer-like effect (e.g., an effect in which an object strikes a user's finger) where the middle of the user input element can output a haptic effect by pushing on, e.g., a user's finger. In an embodiment, the middle component may be located in a recess of the main component, such that the main component at least partially encloses the middle component. In such a configuration, the middle component may be referred to as an inner component, and the main component may be referred to as an outer component. In an embodiment, the outer component may be sensed by a user and have an end stop position at a physical end stop structure, or at a position in which a spring that controls the travel of the user input element has been fully compressed. The inner component may be connected to the outer component by a spring suspension or other form of suspension (e.g., a suspension formed from rubber molding that connects the top pieces of the inner component to the outer component), and may receive torque or force from an actuator via a mechanical connection. In these embodiments, the user can pull on both the inner component and the outer component toward an end stop position. When the outer component of the user input element has been pulled to the end stop position, the ability of the haptic actuator to deliver a full range of haptic effects to the inner component may not be affected, or affected to a very limited degree. In an embodiment, the feature of a user input element having two connected components that are movable relative to each other may be combined with the spring suspension feature of FIGS. 9A-9C, or may be implemented without that spring suspension feature.

Figure 11:
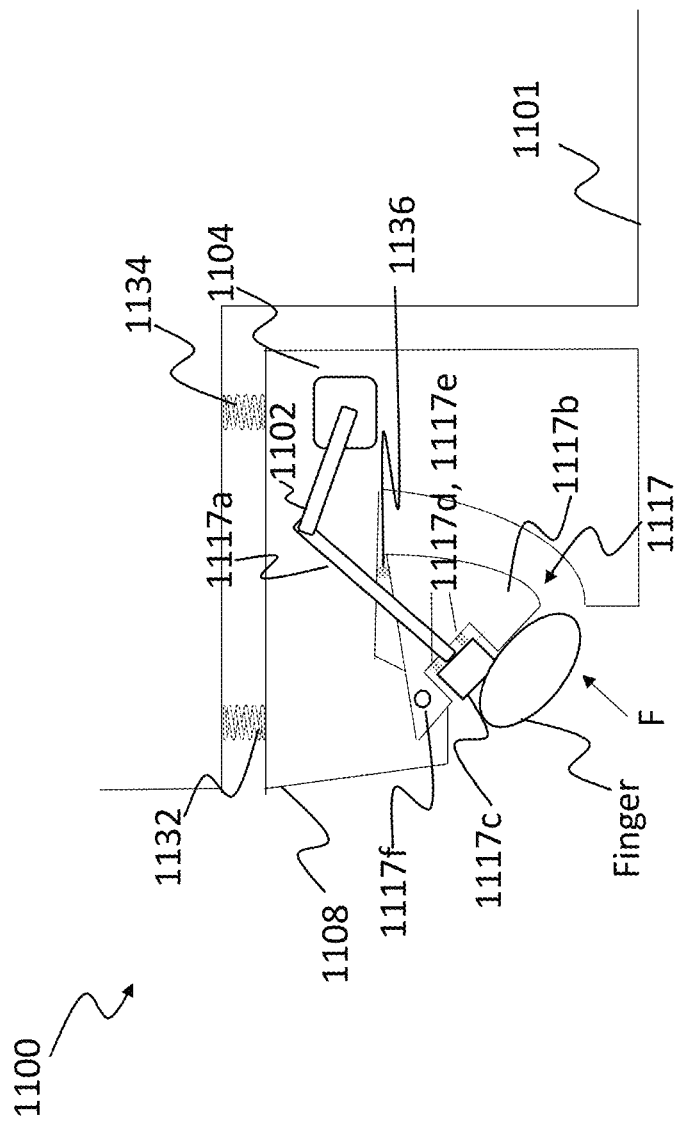
FIG. 11 illustrate a side view of a user input element that has multiple components or portions that are movable relative to each other, according to an embodiment hereof.

FIG. 11 illustrates an embodiment of a user input element having two or more components (also referred to as portions or segments) movable relative to each other. More specifically, FIG. 11 illustrates a handheld controller device 1100 having a controller body 1101 that includes a user input element assembly 1108. The user input element assembly 1108 is attached to a remainder of the controller body 1101 via a spring suspension comprising springs 1132, 1134. The assembly 1108 further comprises a user input element 1117 rotatable relative to the assembly 1108 via a pivot point formed at a hinged end 1117*f* of the user input element 1117. The user input element 1117 includes components 1117*a*-1117*e*. These components may include a lever arm 1117*a*, an outer component 1117*b*, an inner component 1117*c* connected to the lever arm 1117*a*, and springs 1117*d*, 1117*e*. The lever arm 1117*a* may be connected to a transmission component 1102 that transfers torque or force from a haptic actuator 1104 to the inner component 1117*c* of the user input element 1117. The inner component 1117*c* may be disposed within a recess of an outer component 1117*b*, and may be partially housed within the outer component 1117*b*. Part of the inner component 1117*c* may be exposed to a user's finger. The springs 1117*d*, 1117*e* may form a spring suspension that connects the inner component 1117*c* and the outer component 1117*b*, and allows the inner component 1117*c* to be movable relative to the outer component 1117*b*.

In an embodiment, as illustrated in FIG. 11, the outer component 1117*b* may have a range of motion from a first position to an end stop position. The end stop position may be reached when a vibration filter spring 1136 is fully compressed, as illustrated in FIG. 11. The inner component 1117*c* may be connected to a transmission component 1102 via the lever arm 1117*a*. When the outer component 1117*b* is at the end stop position, the transmission component 1102 may still be configured to transfer torque or force to the inner component 1117*c* via the lever arm 1117*a*. Upon receiving the torque or force, the inner component 1117*c* may still be movable relative to the inner component 1117*b* to create a haptic effect. For instance, the transferred force may push the inner component 1117*c* outward, relative to the outer component 1117*b*, to impart a hammer-like effect on a user's finger.

Embodiments Relating to Creating Lateral Motion in User Input Element:

Some embodiments for compensating against haptic diminishment at an end stop position include switching a user input element (e.g., trigger) to move along a different axis of motion when a user input element reaches an end stop position. For instance, if a user input element in these embodiments move within its range of motion along a forward-backward axis of motion, between a first position and an end stop position, these embodiments may cause the user input element to switch to moving along a left-right axis when the user input element is at or near the end stop position.

In an embodiment, a handheld controller device may include a mechanical structure that allows the motion of the user input element or of a user input element assembly to change axes of motion when a user moves the user input element to an end stop position. Stated differently, the structure may cause the user input element to change an orientation of its motion when being actuated by a haptic actuator, where the orientation may depend on whether the user input element is at the end stop position or is away from the end stop position. In an embodiment, the user input element can be pulled or pushed along a first axis of travel. For instance, if the user input element is a trigger that is rotatable about a rotational axis, the trigger may be able to move back and forth generally along a first axis of motion that is perpendicular to the rotational axis. When the trigger or other user input element reaches or nears an end stop position, such as a position corresponding to a fully closed state, the direction of the motion of the trigger assembly may change to be aligned along a second axis of motion that is perpendicular to the first axis. In an embodiment, the second axis may be the rotational axis. That is, the trigger may no longer rotate back and forth about the rotational axis once it is rotated to the end stop position, and may instead move side to side along the rotational axis. In this fashion, the haptic effect may be better perceived by a user, as the actuator is not directly opposing the closing force the user is applying to rotate the user input element to an end stop.

Figure 12B:
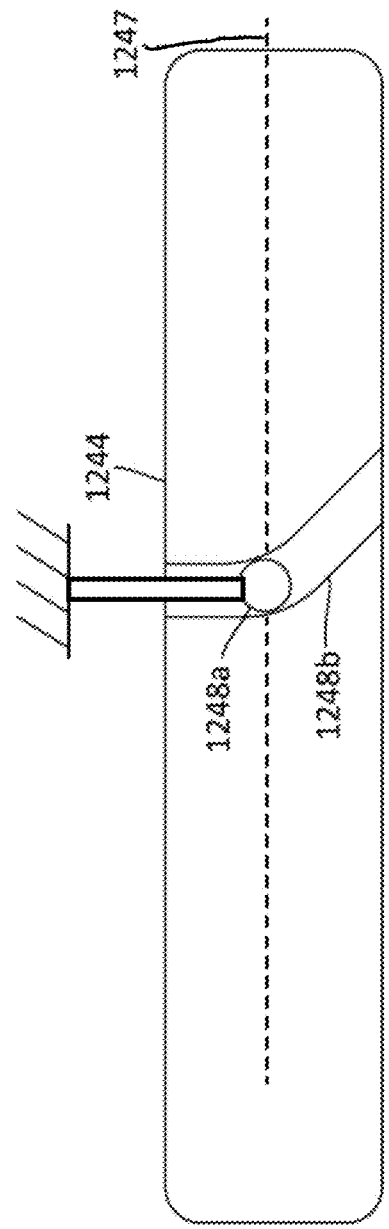

In an embodiment, the mechanical structure may involve a special hinge with a pin/channel combination that acts as a cam for the user input element. When the user input element (e.g., trigger) is depressed, the pin follows the channel. For instance, FIGS. 12, 12A, and 12B illustrate a haptically-enabled controller device 1200 having user input element assembly 1208, which has a user input element 1217 that may be actuated by a haptic actuator 1202. The user input element 1217 is, e.g., a trigger forming a hinge 1245 that allows the user input element 1217 to rotate about a longitudinal axis 1247 of a pin 1244 of the hinge 1245. The hinge 1245 may be formed by a pin 1244 that is constrained by barriers 1252*a-d*, so that it can only rotate about a longitudinal axis 1247 and, in some instances, move axially (e.g., laterally) along the longitudinal axis 1247. The pin 1244 may rotate with the user input element 1217, or may remain stationary as the user input element 1217 is rotated relative to the pin 1244 (e.g., if the user input element 1217 had a sleeve that surrounded the pin 1244 and rotated relative to the stationary pin 1244). The pin 1244 may be configured to cause the user input element 1217 to move along a first orientation (e.g., along a first axis that is the longitudinal axis 1247) when the user input element 1217 is being actuated by the haptic actuator 1202 and is at the end stop position, and to cause the user input element 1217 to move along a second orientation (e.g., along a second axis perpendicular to the longitudinal axis) different than the first orientation when the user input element 1217 is away from the end stop position (e.g., at or near the first position in the user input element's range of motion). For instance, the pin 1244 may have a groove 1248 that engages a follower object 1246 (e.g., a ball) fixed to the user input element 1217 or to another part of the user input element assembly 1208 (or, more generally, to another part of the haptically-enabled controller device). In an embodiment, the follower object 1246 may be directly attached to user input element 1217, such that movement of the follower object 1246 relative to the pin 1244 also pulls (e.g., drags) the user input element 1217 relative to the pin 1244 (e.g., in a direction away from barriers 1252*a*, 1252*b*). In this embodiment, the pin 1244 remains stationary relative to the rest of the user input element assembly 1208 because the follower object 1246 is attached to the user input element 1217. In an embodiment, as illustrated in FIG. 12A, the follower object 1246 may be directly attached to a housing of the user input element assembly 1208. In this embodiment, when the pin 1244 is rotated, it may be moved laterally as well relative to a user input element assembly 1208. Further, the user input element 1217 in this embodiment may be fixed to the pin 1244, and thus move laterally as well (e.g., in a direction away from barriers 1252*a*, 1252*b*).

At a certain angle near the end stop position (or other end travel position), when the user input element is fully depressed, the channel path changes its orientation from a radial groove to an axial groove. Considering that the pin is fixed, the part with the channel (e.g., the trigger) will have to move axially while rotating around the axis when the pin will hit the transition from radial movement to axial movement in the channel path. In this situation, the trigger may stop rotating around its hinge axis and start moving along the hinge axis, effectively providing a left and right movement parallel to the rotating axis. As illustrated in FIG. 12B, the groove 1248 may include a first portion 1248a that is substantially or completely perpendicular to a longitudinal axis 1247 of the pin. It may further include a second portion 1248b that is completely or at least partially parallel with the longitudinal axis 1247 of the pin 1244.

As discussed above, the follower object 1246 may act as a cam follower that follows a cam surface provided by the groove 1248. When a user input element 1217 rotates from a first position, the follower object 1246 may initially be in the first portion 1248a of the groove 1248. In this first portion 1248, the rotation of the user input element 1217 may cause no lateral displacement of the follower component 1246 along the longitudinal axis 1247.

As the user input element 1217 further rotates toward the end stop position, the follower object 1246 may enter the second portion 1248b of the groove. This may occur as the user input element 1217 has rotated to the end stop position, or may occur before it has reached the end stop position. The second portion 1248b of the groove may be at least partially aligned or parallel with the longitudinal axis 1247 of the pin. This may provide a degree of freedom or travel in an axial direction (along the longitudinal axis 1247) for the user input element 1217. The second portion 1248b may also act as a cam surface that moves the follower component 1246 and the user input element 1217 in the axial direction.

Figure 13:
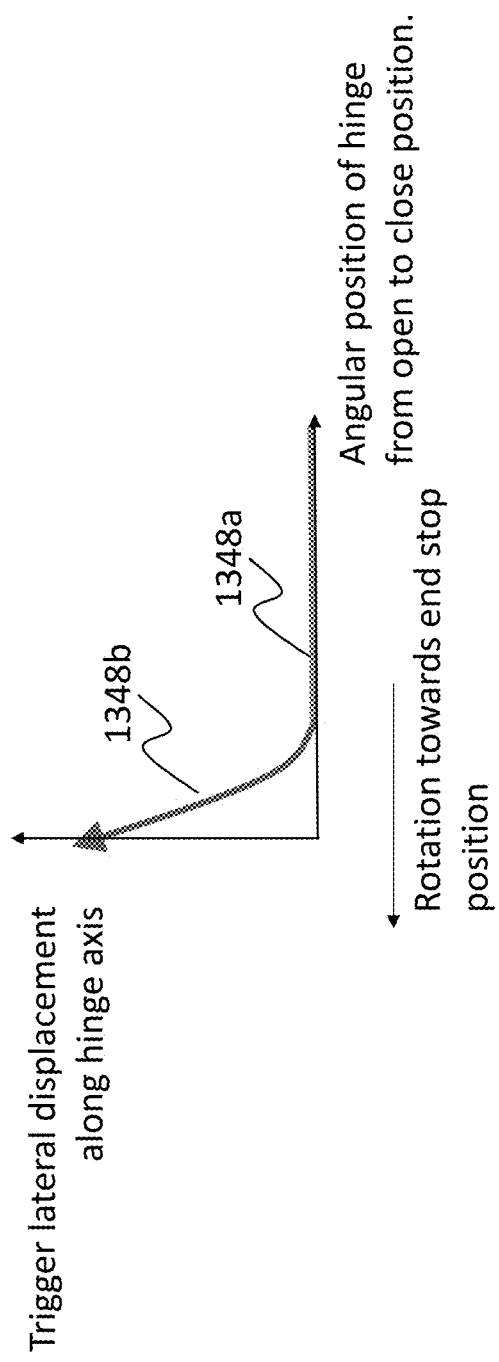
FIG. 13 illustrates a graph showing example values of a relationship between an angular position of a hinge structure and a lateral displacement, according to an embodiment hereof.

An example of the lateral displacement is provided in the graph in FIG. 13. In the graph, a smaller value of the angular position may correspond to a position that is closer to the end stop position. The graph includes a first segment 1348a and a second segment 1348b. The first segment 1348a corresponds to when the follower component 1246 is in the first portion 1248a of the groove, and no lateral displacement is created. The second segment 1348b corresponds to when the follower object 1246 enters the second portion 1248b of the groove, at which point the user input element is laterally displaced along a longitudinal axis 1247 of the pin 1244 forming a hinge 1245 with the user input element.

Thus, embodiments hereof relate to a haptically-enabled controller device 1200 comprising a controller body, a user input element attached to the controller body via a pin, and a haptic actuator (e.g., 1202). The user input element 1217 may be rotatable about a longitudinal axis 1247 of the pin 1244. The haptic actuator may be configured to output a force or torque on the user input element 1217. The pin 1244 may form a groove 1248 that engages a follower object/component 1246 fixed to the user input element 1208 or to the controller body. When the user input element rotates about the longitudinal axis of the pin, the groove and the follower object/component 1246 cause the user input element to also move along the longitudinal axis 1247 of the pin 1244. The groove may cause the force or torque from the haptic actuator to move the user input element in a direction along the longitudinal axis of the pin when the user input element has reached the end stop position. When the user input element is at the end stop position, the force or torque output by the haptic actuator 1202 has at least a component that is parallel to the longitudinal axis of the pin, sliding the user input element axially.

Embodiments Relating to a Potential Energy Accumulator Apparatus:

Some embodiments for compensating for haptic diminishment include using a potential energy accumulator apparatus (e.g., a mechanical energy accumulator apparatus), such as a ratchet-like spring mechanism or a hydraulic mechanism that can store the user applied energy, and thereafter the stored energy can be released when needed. The potential energy accumulator apparatus may act like a capacitor, and store the excess of energy applied by the user finger while pressing the user input element (e.g., trigger). In some embodiments, the energy accumulator has the capacity to release the energy stored in a controlled way using a special signal from a haptic control unit, which can be based on a haptic effect description file that could call for the release. In some situations, the energy accumulator can release the stored energy automatically until no more energy can be released. The energy can be released when the user input element has reached the end stop position, when a force or torque boost is required by the haptic actuator, when another condition occurs, or any combination thereof. The energy released by the accumulator could be directed by the haptic actuator to boost the force applied on the user finger when the user input element (e.g., trigger) is fully depressed at the end stop position. That boost may overcome a high force applied by a user on the user input element when it is fully depressed at the end stop position. The mechanical energy accumulator apparatus may accumulate energy when the user input element is depressed and the force applied by the user is higher than the force provided by an haptic actuator (e.g., motor). Examples of an accumulator suitable for use in embodiment hereof include: a ratchet-like spring mechanism that stores potential energy by means of compressing a spring, a flywheel that stores potential energy in a rotating mass spinning at high speed or a hydraulic accumulator that store potential energy in the form of pressure (e.g., using an incompressible fluid that push against a membrane that acts like a spring).

Figure 14:
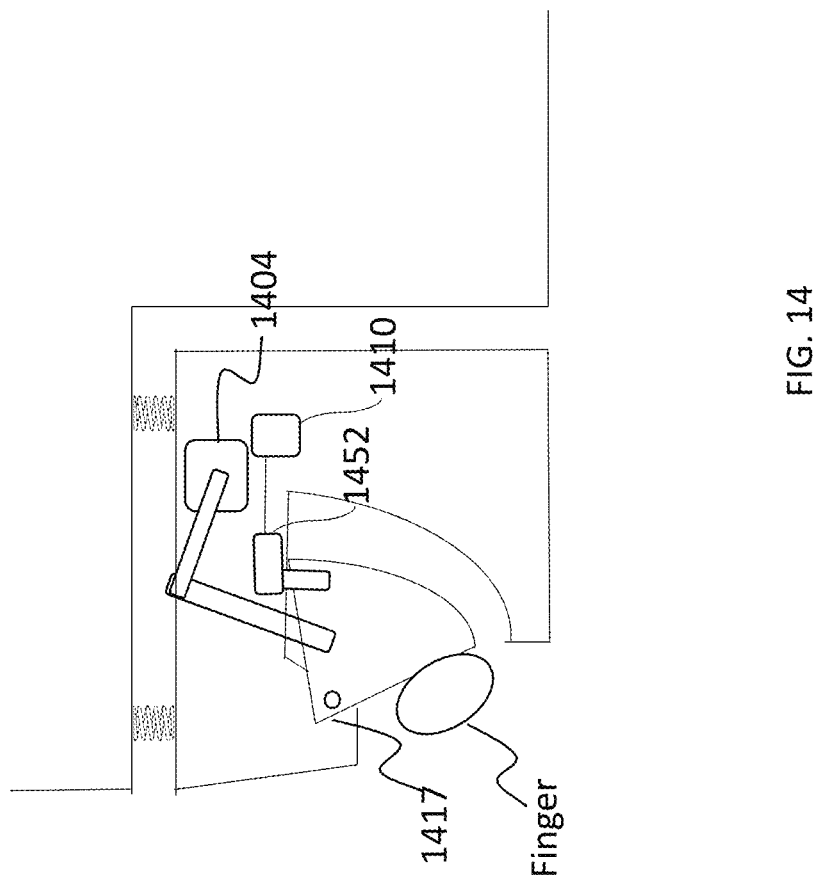
FIG. 14 illustrates a user input element assembly having a potential energy accumulator apparatus, according to an embodiment hereof.

A potential energy accumulator apparatus in accordance with an embodiment hereof is illustrated in FIG. 14. The potential energy accumulator apparatus 1452 (e.g., ratchet, spring, or hydraulic apparatus) may be configured to convert user-applied energy, applied to the user input element 1417, to stored potential energy. The apparatus 1452 may later release the stored potential energy to create a haptic effect when the user input element 1417 is at an end stop position. The apparatus 1452 may, in an embodiment, release its stored energy in response to a control signal from a haptic control unit 1410. The haptic control unit 1410 may output the control signal in response to the determination that the user input element is at the end stop position. The potential energy accumulator apparatus 1452 may be used in combination with features of other embodiments, such as the spring suspension of FIGS. 9A-9C, or as a standalone feature.

Embodiments Relating to Mapping All Haptic Effects to Non-Pull-Style Haptic Effects Other embodiments for compensating against haptic diminishment involve mapping all effects to haptic effects which do not involve exerting a force in a direction toward an end stop structure. For example, the effects may be mapped to haptic effects that push or otherwise forces a user input element outwards rather than pulling or otherwise forcing the user input element further toward the closed position, or rather than pulling or otherwise forcing the user input element against an end stop structure. When the user input element (e.g., trigger) is fully depressed against an end stop structure, it may be physically unable to move further into a body of the controller device. Haptic effects that are directed at pulling the user input element inward (or, more generally, directed at forcing the user input element against an end stop position) are not helpful at this point, as the trigger is already fully depressed. In this situation, push-style haptic effects (or, more generally, haptic effects which are not directed at forcing the user input element against the end stop position) may still be effective as the trigger can push out against the user applied force. For instance, when it is detected that the user input element is in an end stop position (e.g., a fully closed state), a pull-style haptic effect to be generated at the user input element may be mapped or otherwise converted to produce pushing style haptic effects. If a haptic effect is already a push style, then it is played normally. If a haptic effect, or a portion of the haptic effect is a pull style, a haptic engine in a haptic control unit may map or otherwise convert the haptic effect (or a specific portion involving pulling) to a push style haptic effect.

Figure 15:
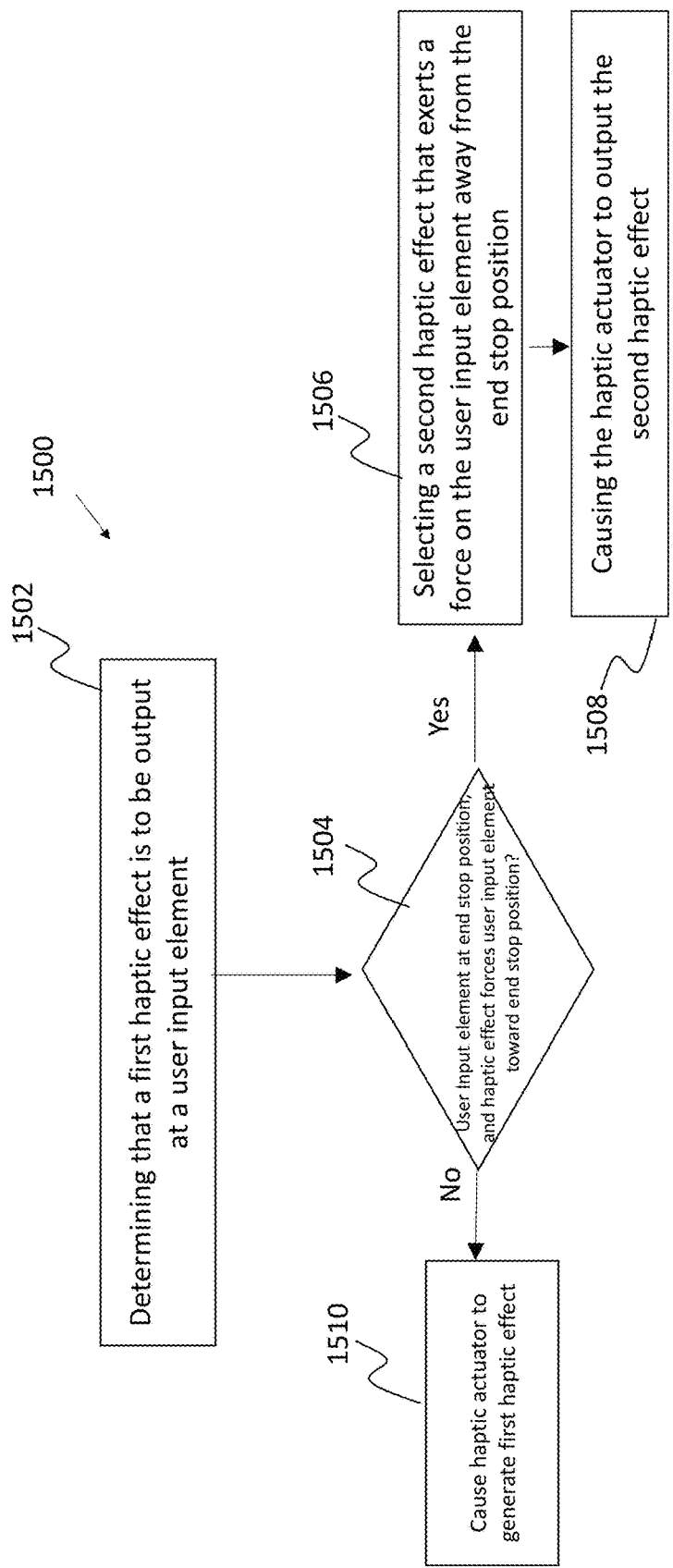
FIG. 15 illustrates example steps of a method performed by a haptic control unit, according to an embodiment hereof.

In an embodiment, the haptic control unit of a haptically-enabled controller may perform a process 1500, see FIG. 15, to change the selection of a first haptic effect, such as a pull-style haptic effect, to a second haptic effect, such as a push-style haptic effect, in response to a determination that the first haptic effect exerts a force on the user input element toward an end stop position. More specifically, FIG. 15 provides a flow diagram that illustrates steps for the process 1500. In an embodiment, the process 1500 includes a step 1502, in which the haptic control unit determines that a first haptic effect is to be output by a haptic actuator. This determination may be in response to a haptic triggering event (e.g., an event in a game application) or in response to a haptic output command from an application. The haptic actuator may be located within a controller body of the haptically-enabled controller, and may be configured to output a force or torque. The haptic control unit may be in signal communication with the haptic actuator, and may activate the actuator by sending, a driving signal to, e.g., the actuator or a pulse width modulation (PWM) driver.

In step 1504, the haptic control unit may determine whether the user input element is at the end stop position, and whether the first haptic effect exerts a force on the user input element toward the end stop position.

In step 1506, in response to a determination that the user input element is at the end stop position and that the first haptic effect exerts a force on the user input element toward the end stop position, the haptic control unit may select a second haptic effect that exerts a force on the user input element away from the end stop position. In an embodiment, a storage device may store one or more haptic effects that are mapped (e.g., linked in a data structure) to the first haptic effect, and the haptic control unit in step 1506 may select the second haptic effect by selecting one of the one or more haptic effects that are mapped to the first haptic effect. In step 1508, the control unit causes the haptic actuator to output the second haptic effect instead of the first haptic effect.

In step 1510, in response to a determination that the user input element is not at the end stop position, or that the first haptic effect does not exert a force on the user input element toward the end stop position, the haptic control unit causes the haptic actuator to output the first haptic effect.

In an embodiment, when a haptic control unit of an embodiment herein determines that a user input element is at an end stop position, it may cause any haptic effect that is output at the user input element to be a push-style haptic effect or any other haptic effect that exerts a force on the user input element away from the end stop position, or may employ one of the techniques discussed above with respect to FIGS. 8 and 14. For instance, when the user input element is at an end stop position and a haptic triggering event (i.e., an event that triggers a haptic effect) occurs, the haptic control unit may perform at least one of the following: i) select a haptic effect that is not a pull-style haptic effect (e.g., select a push-style haptic effect) and cause the selected haptic effect to be generated at the user input element; ii) cause a haptic effect to be output at an ERM instead of the user input element, such as by using a switching device to disengage the user input element from an actuator, and to engage the actuator with the ERM (see FIG. 8); and iii) cause a potential energy accumulator apparatus to release stored energy, in order to generate a haptic effect on the user input element, or to boost a haptic effect already being output at the user input element (see FIG. 14).

Embodiments Relating to Use of Nonlinear Spring

Other embodiments for compensating for haptic diminishment involve using a nonlinear spring. The non-linear spring may exert a force at a rate that ramps up in slope as the spring is compressed. The nonlinear spring may be implemented through, e.g., a coiled spring, a beam-shaped spring, or a sealed air cylinder. In an embodiment, the nonlinear spring may be used alongside a second spring (e.g., a linear spring). The second spring may, for example, be attached to the user input element and the user input element assembly, and may be configured to bias the user input element to an equilibrium position. In an embodiment, the nonlinear spring may be unengaged until the user input element reaches a certain position in its range of motion.

In an embodiment, the nonlinear spring may be implemented through a coiled spring having a changing pitch of the spring windings. At a starting portion of the spring, the spring will be wound with a high pitch (e.g. 2 mm per revolution, such that a next consecutive winding of wire is 2 mm further down the cylinder shaped by the spring). As windings continue, the pitch may be decreased. As an example, the pitch may decrease to 1 mm per revolution several turns later. This may create a stiffer spring as this later portion is engaged.

In an embodiment, the nonlinear spring may be implemented through a sealed air cylinder (or other shaped sealed device, such as a bladder) or a rubber material. In such cases, as the cylinder is engaged, the pressure increase is initially small, so that the user is able to increase the pressure as travel continues. As pressure continues to increase in the sealed air cylinder, it may become harder to continue compressing fluid in the cylinder. Because the cylinder may be attached to the user input element, the user input element may also become increasingly difficult to move toward the end stop position. In some cases, no matter how hard the user pulls, they can never reach a "stopped" position. In some cases, the pressure increase may prevent the end stop position from being reached.

In an embodiment, a soft rubbery material could be used to form a nonlinear spring. As the rubbery material is compressed or stretched towards an end stop position, it may exert a force in an opposite direction that grows in a nonlinear fashion. This would allow the user input element to interact with the secondary spring at low forces, but limit how far a user can move the user input element, thus helping to ensure that the user input element remains in an elastic region of interaction.

Figure 16A:
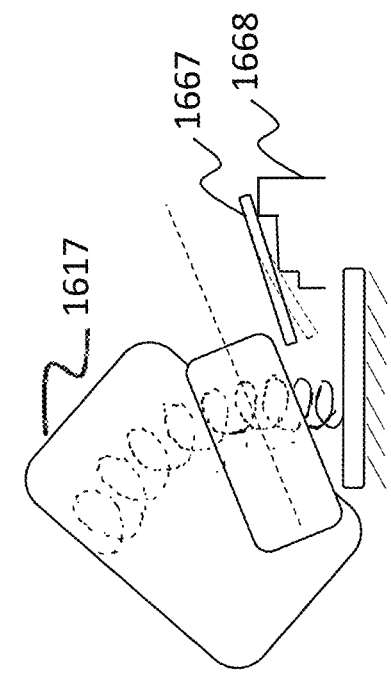
FIGS. 16A-16B illustrate nonlinear springs that engage a user input element, according to an embodiment hereof.

FIG. 16A illustrates an embodiment of a user input element assembly 1600 having a first spring 1662 (e.g., a linear spring with a uniform pitch) and a nonlinear spring 1664. The first spring 1662 may, for example, be a biasing spring that moves user input element 1617 to an equilibrium position. As discussed above, the second spring 1664 may be a coiled spring having non-uniform pitch, may be a sealed cylinder, may be a rubbery material, or any combination thereof.

In an embodiment, the nonlinear spring may be implemented through a multi-clamped beam. In such cases, the beam is clamped at an initial length, giving it an initial stiffness defined by its cross section and its length. As the beam bends, it may engage a shaped barrier behind the spring. This shaped barrier may effectively reduce the length of the spring (e.g., move the pivot point of the beam closer and closer to its tip). This reduction in length may make the beam stiffer to bend. The shaped barrier which effectively reduces the length of the spring may, for example, be shaped to have a series of steps, or have a smooth curved shape, which may increase the stiffness in a smooth progression.

Figure 16B:
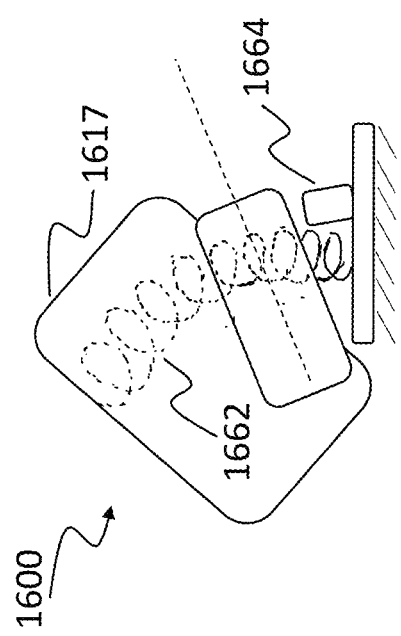

A multi-clamped beam spring is illustrated in FIG. 16B. This nonlinear spring may include a beam-shaped spring 1667 and a shaped barrier 1668. As the user input element 1617 engages the beam-shaped spring 1667, it may bend the beam-shaped spring 1667 and cause it to come in contact with points on the shaped barrier 1668. This may effectively move a pivot point of the beam-shaped spring 1667 closer to its tip, which may increase the stiffness of the beam-shaped spring.

Additional Embodiments

In an embodiment, a user input element assembly may incorporate stiffer springs in the end stop design.

In an embodiment, a user input element may cause a different actuator (e.g., a body actuator) than a haptic actuator in the user input element assembly to output a haptic effect when the user input element is at an end stop position.

Thus, when for example a user is playing a game and is holding a game controller trigger fully depressed to fire a machine gun in the game, one or more of the above embodiments may allow for no reduction, or only limited reduction in a haptic effect to allow the user to feel each shot as the shot is fired.

Summary of the Embodiments

One aspect of the embodiments herein relates to a controller device comprising: a user input element having a range of motion that extends from a first position to an end stop position, and configured to output a control signal based on a position of the user input element within the range of motion; a haptic actuator configured to output a force or torque; a transmission component configured to transfer the force or torque to the user input element with a multiplication factor that is greater when the user input element is at the end stop position than when the user input element is at another position within the range of motion.

In some instances, the haptic actuator is a motor, and the transmission component comprises a lever arm configured to transfer to the user input element the torque or force output by the motor. The lever arm and the user input element are connected in a manner that increases the multiplication factor as the user input element moves closer to the end stop position.

In some instances, the lever arm and the user input element are connected in a manner such that a length from a pivot point on the lever arm to a connection point on the lever arm that connects to the user input element changes as the user input element moves closer to the end stop position.

In some instances, the lever arm has a slot extending along a longitudinal axis of the lever arm, and the connection point moves closer to the pivot point as the user input element moves toward the end stop position, such that the length from the pivot point to the connection point changes as the user input element moves toward the end stop position.

In some instances, the controller element comprises a second lever arm connected to the lever arm of the transmission component. Rotation of the lever arm causes rotation of the second lever arm and of the rest of the controller element, and a longitudinal axis of the lever arm and a longitudinal axis of the second lever arm are more aligned in the end stop position than in the first position.

In some instances, the lever arm is configured to transfer the torque or force output by the motor with a multiplication factor of 0.5 when the user input element is at the first position, with a multiplication factor of more than 1 when the user input element is at the end stop position.

In some instances, the controller device further comprises an end stop structure located next to the user input element, and the end stop position is a position at which the user input element is in contact with the end stop structure.

In some instances, the user input element is a trigger, thumbstick, joystick, or a push button.

One aspect of the embodiments herein relates to a controller device comprising: a user input element having a range of motion that extends from a first position to an end stop position, and configured to output a control signal based on a position of the user input element within the range of motion; a haptic actuator configured to output a force or torque; a transmission component configured to transfer the force or torque to the user input element; and a haptic control unit configured to determine whether the user input element is at the end stop position and, in response to the determination that the user input element is at the end stop position, to select a haptic effect that is not a pull-style haptic effect, and to cause the haptic actuator and the transmission component to generate the selected haptic effect at the user input element.

In some instances, the haptic control unit is configured to, in response to the determination that the user input element is at the end stop position, to select a push-style haptic effect that causes the haptic actuator to exert a pushing force on the user input element.

In some instances, the user input element and the transmission component are part of a user input element assembly that further includes an eccentric rotating mass (ERM) apparatus. The controller device further comprises a switching device located between the haptic actuator and the transmission component, and between the haptic actuator and the ERM apparatus, and the haptic control unit is configured to, in response to the determination that the user input element is at the end stop position, cause the switching device to uncouple the haptic actuator from the transmission component to stop force or torque output therebetween, and to couple the haptic actuator to the ERM apparatus to provide force or torque output therebetween.

In some instances, the switching device receives the force or torque output by the haptic actuator, and comprises one or more clutches that are configured to, in response to a control signal from the haptic control unit, disengage with the transmission component so that the transmission component does not receive the force or torque output by the haptic actuator, and to engage with the ERM apparatus so that the ERM apparatus receives the force or torque output by the haptic actuator.

In some instances, the switching device further comprises a potential energy accumulator apparatus configured to convert user-applied energy on the user input element to potential energy and to store the potential energy, and to release the stored potential energy to create a haptic effect when the user input element is at the end stop position.

In some instances, the potential energy accumulator apparatus is configured to release its stored energy in response to a control signal from the haptic control unit. The haptic control unit is configured to output the control signal in response to the determination that the user input element is at the end stop position.

In some instances, the potential energy accumulator apparatus comprises at least one of: i) a ratchet apparatus configured to convert user-applied energy at the user input element to potential energy, and ii) a hydraulic apparatus configured to convert user-applied energy at the user input element to potential energy, and iii) a flywheel apparatus configured to convert user-applied energy at the user input element to potential energy.

In some instances, the potential energy accumulator apparatus may be an electrical energy accumulator apparatus such as a capacitor (e.g., super-capacitor). In some instances, the potential energy accumulator apparatus may be a chemical energy accumulator apparatus such as a battery.

One aspect of the embodiments herein relates to a controller device comprising: a user input element assembly having a housing and a user input element movable relative to the housing, wherein the user input element has a range of motion that extends from a first position to an end stop position, and configured to output a control signal based on a position of the user input element within the range of motion; a controller body attached to the user input element assembly via an elastically deformable element (e.g., spring suspension) such that the user input element assembly is movable relative to the controller body; a haptic actuator configured to output a force or torque; and a transmission component configured to transfer the force or torque to the user input element.

In some instances, the elastically deformable element is a spring suspension that comprises one or more springs that have a level of stiffness such that a user-applied force which moves the user input element to the end stop position does not fully compress the one or more springs.

In some instances, the user input element assembly comprises a first spring located between the user input element and the housing, and configured to dampen vibration, and the spring suspension attaching the user input element assembly to the controller body comprises one or more second springs that are each stiffer than the first spring.

One aspect of the embodiments herein relates to a controller device comprising: a user input element having a range of motion that extends from a first position to an end stop position, and configured to output a control signal based on a position of the user input element within the range of motion; a haptic actuator configured to output a force or torque; a transmission component configured to transfer the force or torque to the user input element; a mechanical detent configured to engage the user input element at or near the end stop position.

In some instances, the mechanical detent is configured to engage the user input element before it reaches the end stop position, and is configured to deform as the user input element moves toward the end stop position.

In some instances, the mechanical detent comprises a snap button located on a surface of a housing connected to the user input element.

One aspect of the embodiments herein relates to a controller device comprising: a user input element having a range of motion that extends from a first position to an end stop position, and configured to output a control signal based on a position of the user input element within its range of motion; a haptic actuator configured to output a force or torque; a transmission component configured to transfer the force or torque to the user input element; a control unit configured to determine whether the user input element is at or near the end stop position and, in response to that determination, cause the haptic actuator and the transmission component to output a haptic effect on the user input element to indicate to a user that the user input element is near or at the end stop position.

One aspect of the embodiments herein relate to a controller device comprising: a user input element assembly having a housing and a user input element attached to the housing via a pin, and rotatable about a longitudinal axis of the pin; a haptic actuator configured to output a force or torque; a transmission component configured to transfer the force or torque to the user input element. The pin forms a groove that engages a component fixed to the user input element or to the housing of the user input element assembly. When the user input element rotates about the longitudinal axis of the pin, the groove causes the user input element to also move along the longitudinal axis of the pin. The haptic actuator and the transmission component are configured to exert a force or torque that causes the user input element to move in a direction along the longitudinal axis of the pin when the user input element has reached the end stop position.

In some instances, the groove has a first portion that is a radial groove which is completely perpendicular to the longitudinal axis of the pin, and has a second portion which is partially parallel with the longitudinal axis of the pin.

One aspect of the embodiments herein relate to a controller device comprising: a user input element assembly having a housing and a user input element movable relative to the housing; a haptic actuator configured to output a force or torque; and a transmission component configured to transfer the force or torque to the user input element. The user input element comprises a first component and a second component moveable relative to the first component. The first component of the user input element has a range of motion that extends from a first position to an end stop position. The transmission component is configured to transfer the force or torque output by the haptic actuator to the second component of the user input element that is moveable relative to the first component.

In some instances, the first component is an outer component of the user input element, and the second component is an inner component partially enclosed by the outer component.

In some instances, the inner component is connected to the outer component by a spring suspension.

One aspect of the present embodiments relate to a controller device comprising: a user input element assembly comprising: a user input element having a range of motion that extends to an end stop position, and configured to output a control signal based on a position of the user input element within the range of motion; a housing within which the user input element is disposed; a first spring attached to the user input element and the housing; and a second spring attached to the user input element and the housing, the second spring being a nonlinear spring configured to exert a force that increases in a nonlinear rate in a direction opposite the movement of the user input element as the user input element moves toward the end stop position.

In some instances, the first spring is a linear spring.

In some instances, the second spring comprises a coiled spring having windings that decrease in pitch in a direction toward the end stop position.

In some instances, the second spring comprises a beam-shaped spring configured to engage the user input element and to bend as the user input element moves toward the end stop position. The user input element assembly further includes a barrier that engages different points on the beam-shaped spring as the spring bends so as to move a pivot point of the beam-shaped spring closer to a tip of the beam-shaped spring.

In some instances, the second nonlinear spring comprises a sealed cylinder having a fluid therein. Movement of the user input element towards the end stop position causes the fluid to be compressed.

In some instances, the second nonlinear spring comprises a rubber material.

One aspect of the embodiments herein relates to a method of enhancing haptic effects in a haptically-enabled controller device that includes i) a user input element assembly which comprises a user input element having a range of motion that extends from a first position to an end stop position, ii) a haptic actuator, iii) a transmission component that transfers output force or torque from the haptic actuator to the user input element, and iv) a haptic control unit in communication with the haptic actuator. The method comprises: a haptic control unit of the controller device determining whether the user input element is at an end stop position; in response to determining that the user input element is at the end stop position, the haptic control unit performing one of the following: i) selecting a haptic effect that is not a pull-style haptic effect and causing the selected haptic effect to be generated at the user input element; ii) causing a switching device to uncouple the transmission component from the haptic actuator and to couple an ERM apparatus in the user input element assembly to the haptic actuator so that the haptic effect is generated at the ERM apparatus in the user input element assembly; iii) causing potential energy accumulator apparatus to release stored energy to boost a haptic effect at the user input element.

In some instances, the selected haptic effect is a push-style haptic effect.

In some instances, the switching device comprises one or more clutches.

In some instances, the potential energy accumulator apparatus includes a ratchet-constrained spring, a hydraulic mechanism, a flywheel, a capacitor, or a battery.

One aspect of the embodiments herein relates to a controller device comprising: a trigger having a range of motion that extends from a first angle to an end stop angle, and configured to output a control signal based on a position of the user input element (e.g., trigger) within the range of motion; an actuator assembly having a motor and a gearbox, and configured to output a force or torque; and a lever arm configured to transfer the force or torque to the user input element with a multiplication factor that is greater when the user input element is at the end stop angle than when the user input element is at another angle within the range of motion.

One aspect of the embodiments herein relates to a controller device according to one of the embodiments above, further comprising a communication device configured to communicate the control signal output by the user input element to a processor executing a virtual reality (VR), augmented reality (AR) application or a standard game on a console/computer/television/phone/tablet etc.

One aspect of the embodiments herein relate to a controller device according to one of the embodiments above, where the controller device is part of a wearable device.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A haptically-enabled controller device comprising:
a controller body;
a user input element attached to the controller body and having a range of motion relative to the controller body that extends from a first position to an end stop position;
a motor located within the controller body and configured to output a force or torque;
a transmission component connected to the motor and to the user input element,
wherein the transmission component is configured to transfer the force or torque from the motor to the user input element with a first multiplication factor when the user input element is at the first position, and to transfer the force or torque from the motor to the user input element with a second multiplication factor when the user input element is at the end stop position, wherein the second multiplication factor is higher than the first multiplication factor.

2. The haptically-enabled controller device of claim 1, further comprising a spring that extends between the user input element and the end stop position, wherein the first position corresponds to an equilibrium position of the spring, such that the spring is configured to bias the user input element to the first position.

3. The haptically-enabled controller device of claim 1, further comprising a moveable mass, a switching device, and a haptic control unit, wherein:
the moveable mass is configured to output a vibrotactile haptic effect when the moveable mass is actuated by the motor,
the switching device is configured to switchably engage the motor with one of the user input element and the moveable mass,
the haptic control unit is in signal communication with the motor and is configured to determine whether the user input element is at the end stop position, and in response to a determination that the user input element is at the end stop position, to cause the switching device to engage the motor with the moveable mass and to disengage the motor from the user input element, such that a force or torque output by the motor actuates the moveable mass to generate the vibrotactile haptic effect.

4. The haptically-enabled controller device of claim 1, further comprising a haptic control unit configured:
to determine that a first haptic effect is to be output by the motor,
to determine whether the user input element is at the end stop position, and whether the first haptic effect exerts a force on the user input element towards the end stop position,
in response to a determination that the user input element is at the end stop position and that the first haptic effect exerts a force on the user input element toward the end stop position, to select a second haptic effect that exerts a force on the user input element away from the end stop position, and to cause the motor to output the second haptic effect instead of the first haptic effect.

5. The haptically-enabled controller device of claim 1, further comprising:
a housing within which the user input element is disposed; and
a spring attached to the user input element and the housing, the spring being a nonlinear spring configured to exert a force that increases in a nonlinear rate in a direction opposite the movement of the user input element as the user input element moves toward the end stop position.

6. The haptically-enabled controller device of claim 1, wherein the user input element comprises a first component and a second component connected to the first component and moveable relative thereto, and wherein the motor is configured to actuate the second component relative to the first component, wherein the first component is an outer component of the user input element, the second component is an inner component of the user input element that is partially enclosed by the outer component, the inner component being connected to the motor by the transmission component.

7. The haptically-enabled controller device of claim 1, wherein the user input element is part of a user input element assembly having a housing disposed within or attached to the controller body via a spring suspension such that the housing of the user input element assembly is movable relative to the controller body, wherein the spring suspension causes the force or torque from the motor to move the housing of the user input element assembly relative to the controller body.

8. The haptically-enabled controller device of claim 1, wherein the user input element is attached to the controller body via a pin, and rotatable about a longitudinal axis thereof between the first position and the end stop position, wherein the pin is configured to cause the user input element to move along a first orientation when the user input element is being actuated by the motor and is at the end stop position, and to cause the user input element to move along a second orientation when the user input element is being actuated by the motor and is away from the end stop position, wherein the first orientation is perpendicular to the second orientation.

9. A haptically-enabled controller device comprising:
a controller body;
a user input element attached to the controller body and having a range of motion relative to the controller body that extends from a first position to an end stop position;
a haptic actuator located within the controller body and configured to output a force or torque,
a transmission component having a first arm that is connected to the haptic actuator and to the user input element,
wherein the user input element has a second arm that is connected to the first arm such that a longitudinal axis of the first arm and a longitudinal axis of the second arm are more aligned when the user input element is in the end stop position than when the user input element is at the first position of its range of motion, and
wherein the transmission component is configured to transfer the force or torque from the haptic actuator to the user input element with a first multiplication factor when the user input element is at the first position, and to transfer the force or torque from the haptic actuator to the user input element with a second multiplication factor when the user input element is at the end stop position, wherein the second multiplication factor is higher than the first multiplication factor.

10. The haptically-enabled controller device of claim 9, wherein the first arm comprises a pivot point at which the first arm is attached to the haptic actuator, wherein the first arm is further connected to the second arm through a connecting element of the second arm, and wherein the second arm and the first arm are connected in a manner such that a length from the pivot point to the connecting element decreases as the user input element moves from the first position to the end stop position.

11. The haptically-enabled controller device of claim 10, wherein the user input element is rotatable or translatable relative to the controller body from the first position to the end stop position.

12. The haptically-enabled controller device of claim 11, wherein the user input element is a trigger, button, joystick, or thumbstick.

13. The haptically-enabled controller device of claim 11, wherein the first arm has a slot extending along the longitudinal axis thereof, and wherein the connecting element of the second arm is a pin inserted through the slot and is configured to slide within the slot toward the pivot point as the user input element rotates toward the end stop position.

14. The haptically-enabled controller device of claim 13, wherein the haptic actuator is a motor configured to output the force or torque, wherein the force or torque is configured to rotate the first arm in a first direction, and to rotate the user input element in a second and opposite direction.

15. A haptically-enabled controller device comprising:
a controller body;
a trigger attached to the controller body and having a range of motion relative to the controller body that extends from a first position to an end stop position;
a haptic actuator located within the controller body and configured to output a force or torque; and
a transmission component connected to the haptic actuator and to the trigger,
wherein the transmission component is configured to transfer the force or torque from the haptic actuator to the trigger with a first multiplication factor when the trigger is at the first position, and to transfer the force or torque from the haptic actuator to the trigger with a second multiplication factor when the trigger is at the end stop position, wherein the second multiplication factor is higher than the first multiplication factor, and
wherein the trigger comprises a first component and a second component connected to the first component and moveable relative thereto, and wherein the haptic actuator is configured to actuate the second component relative to the first component, wherein the first component is an outer component of the trigger, the second component is an inner component of the trigger that is partially enclosed by the outer component, the inner component being connected to the haptic actuator by the transmission component.

16. The haptically-enabled controller device of claim 15, wherein the haptic actuator comprises a motor that is configured to output the force or torque.

* * * * *